US010936479B2

(12) United States Patent
Maag et al.

(10) Patent No.: US 10,936,479 B2
(45) Date of Patent: *Mar. 2, 2021

(54) PLUGGABLE FAULT DETECTION TESTS FOR DATA PIPELINES

(71) Applicant: Palantir Technologies, Inc., Palo Alto, CA (US)

(72) Inventors: Peter Maag, New York, NY (US); Jacob Albertson, New York, NY (US); Jared Newman, Canberra (AU); Matthew Lynch, New York, NY (US); Maciej Albin, London (GB); Viktor Nordling, Watson (AU)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,404

(22) Filed: Sep. 16, 2019

(65) Prior Publication Data

US 2020/0012593 A1    Jan. 9, 2020

Related U.S. Application Data

(63) Continuation of application No. 15/671,423, filed on Aug. 8, 2017, now Pat. No. 10,417,120, which is a
(Continued)

(51) Int. Cl.
*G06F 11/36* (2006.01)
*G06F 11/07* (2006.01)

(52) U.S. Cl.
CPC ...... *G06F 11/3692* (2013.01); *G06F 11/0775* (2013.01); *G06F 11/0751* (2013.01)

(58) Field of Classification Search
CPC ............ G06F 11/079; G06F 11/3668–3696
See application file for complete search history.

(56) References Cited

U.S. PATENT DOCUMENTS

| 5,418,950 A | 5/1995 | Li et al. |
| 5,428,737 A | 6/1995 | Li et al. |

(Continued)

FOREIGN PATENT DOCUMENTS

| DE | 102014103482 | 9/2014 |
| DE | 102014213036 | 1/2015 |

(Continued)

OTHER PUBLICATIONS

U.S. Appl. No. 14/019,534, filed Sep. 5, 2013, First Office Action Interview, dated Jul. 20, 2015.

(Continued)

*Primary Examiner* — Joseph R Kudirka
(74) *Attorney, Agent, or Firm* — Hickman Becker Bingham Ledesma LLP

(57) ABSTRACT

Discussed herein are embodiments of methods and systems which allow engineers or administrators to create modular plugins which represent the logic for various fault detection tests that can be performed on data pipelines and shared among different software deployments. In some cases, the modular plugins each define a particular test to be executed against data received from the pipeline in addition to one or more configuration points. The configuration points represent configurable arguments, such as variables and/or functions, referenced by the instructions which implement the tests and that can be set according to the specific operation environment of the monitored pipeline.

18 Claims, 12 Drawing Sheets

Related U.S. Application Data continuation of application No. 14/877,229, filed on Oct. 7, 2015, now Pat. No. 9,772,934.

(60) Provisional application No. 62/218,399, filed on Sep. 14, 2015.

(56) References Cited

U.S. PATENT DOCUMENTS

| | | |
|---|---|---|
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Xbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bingham |
| 5,911,138 A | 6/1999 | Li et al. |
| 5,918,225 A | 6/1999 | White et al. |
| 6,057,757 A | 5/2000 | Arrowsmith et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,643,613 B2 | 11/2003 | McGee et al. |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez et al. |
| 7,028,223 B1 | 4/2006 | Kolawa et al. |
| 7,085,890 B2 | 8/2006 | Kashyap |
| 7,117,430 B2 | 10/2006 | Maguire et al. |
| 7,155,728 B1 | 12/2006 | Prabhu et al. |
| 7,406,592 B1 | 7/2008 | Polyudov |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,739,246 B2 | 6/2010 | Mooney et al. |
| 7,783,679 B2 | 8/2010 | Bley |
| 7,853,573 B2 | 12/2010 | Warner et al. |
| 7,877,421 B2 | 1/2011 | Berger et al. |
| 7,895,565 B1 | 2/2011 | Hudgons et al. |
| 7,908,521 B2 | 3/2011 | Sridharan et al. |
| 7,912,930 B1 | 3/2011 | Farooqui et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,499,287 B2 | 7/2013 | Shafi et al. |
| 8,560,494 B1 | 10/2013 | Downing |
| 8,601,326 B1 | 12/2013 | Kirn |
| 8,639,552 B1 | 1/2014 | Chen et al. |
| 8,799,867 B1 | 8/2014 | Peri-Glass et al. |
| 8,909,597 B2 | 12/2014 | Aymeloglu et al. |
| 8,924,429 B1 | 12/2014 | Fisher et al. |
| 8,935,201 B1 | 1/2015 | Fisher et al. |
| 9,031,981 B1 | 5/2015 | Potter et al. |
| 9,105,000 B1 | 8/2015 | White et al. |
| 9,678,850 B1 | 6/2017 | Rickard et al. |
| 9,772,934 B2 | 9/2017 | Maag et al. |
| 10,133,782 B2 | 11/2018 | Pryce et al. |
| 10,318,398 B2 | 6/2019 | Rickard et al. |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0117387 A1 | 6/2004 | Civetta et al. |
| 2004/0126840 A1 | 7/2004 | Cheng et al. |
| 2004/0139212 A1 | 7/2004 | Mukherjee et al. |
| 2004/0153837 A1 | 8/2004 | Preston et al. |
| 2004/0181490 A1 | 9/2004 | Gordon et al. |
| 2004/0193608 A1 | 9/2004 | Gollapudi et al. |
| 2005/0004911 A1 | 1/2005 | Goldberg et al. |
| 2005/0021397 A1 | 1/2005 | Cui et al. |
| 2005/0120080 A1 | 6/2005 | Weinreb et al. |
| 2005/0183005 A1 | 8/2005 | Denoue et al. |
| 2005/0226473 A1 | 10/2005 | Ramesh |
| 2005/0251786 A1 | 11/2005 | Citron et al. |
| 2005/0278286 A1 | 12/2005 | Djugash et al. |
| 2006/0004740 A1 | 1/2006 | Dettinger et al. |
| 2006/0069717 A1 | 3/2006 | Mamou et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0129992 A1 | 6/2006 | Oberholzer |
| 2006/0142949 A1 | 6/2006 | Helt |
| 2006/0161558 A1 | 7/2006 | Tamma et al. |
| 2006/0209085 A1 | 9/2006 | Wong et al. |
| 2006/0271884 A1 | 11/2006 | Hurst |
| 2006/0288046 A1 | 12/2006 | Gupta et al. |
| 2007/0005582 A1 | 1/2007 | Navratil et al. |
| 2007/0027851 A1 | 2/2007 | Kruy et al. |
| 2007/0094248 A1 | 4/2007 | McVeigh et al. |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0260582 A1 | 11/2007 | Liang |
| 2008/0104407 A1 | 5/2008 | Horne et al. |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0267386 A1 | 10/2008 | Cooper |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0248721 A1 | 10/2009 | Burton et al. |
| 2009/0282068 A1 | 11/2009 | Shockro et al. |
| 2009/0299830 A1 | 12/2009 | West et al. |
| 2009/0319418 A1 | 12/2009 | Herz |
| 2010/0011282 A1 | 1/2010 | Dollard et al. |
| 2010/0073315 A1 | 3/2010 | Lee et al. |
| 2010/0082671 A1 | 4/2010 | Li et al. |
| 2010/0094829 A1 | 4/2010 | Castellanos et al. |
| 2010/0125470 A1 | 5/2010 | Chisholm |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0211550 A1 | 8/2010 | Daniello et al. |
| 2011/0035396 A1 | 2/2011 | Merz et al. |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0131547 A1 | 6/2011 | Elaasar |
| 2011/0145401 A1 | 6/2011 | Westlake |
| 2011/0208822 A1 | 8/2011 | Rathod |
| 2011/0246826 A1 | 10/2011 | Hsieh |
| 2011/0252282 A1 | 10/2011 | Meek et al. |
| 2011/0258216 A1 | 10/2011 | Supakkul et al. |
| 2011/0270871 A1 | 11/2011 | He et al. |

(56) References Cited

U.S. PATENT DOCUMENTS

| | | | |
|---|---|---|---|
| 2011/0321008 A1 | 12/2011 | Jhoney et al. |
| 2012/0066187 A1 | 3/2012 | Pearcy et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2012/0290879 A1 | 11/2012 | Shibuya et al. |
| 2013/0006947 A1 | 1/2013 | Olumuyiwa et al. |
| 2013/0024268 A1 | 1/2013 | Manickavelu |
| 2013/0024371 A1 | 1/2013 | Shochat et al. |
| 2013/0024731 A1 | 1/2013 | Shochat |
| 2013/0054551 A1 | 2/2013 | Lange |
| 2013/0086482 A1 | 4/2013 | Parsons |
| 2013/0091084 A1 | 4/2013 | Lee |
| 2013/0096968 A1 | 4/2013 | Van Pelt et al. |
| 2013/0097130 A1 | 4/2013 | Bingol et al. |
| 2013/0179982 A1 | 7/2013 | Bridges et al. |
| 2013/0198565 A1 | 8/2013 | Mancoridis et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2013/0251233 A1 | 9/2013 | Yang et al. |
| 2014/0012886 A1 | 1/2014 | Downing et al. |
| 2014/0040182 A1 | 2/2014 | Gilder et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0214579 A1 | 7/2014 | Shen et al. |
| 2014/0244388 A1 | 8/2014 | Manouchehri et al. |
| 2014/0310821 A1 | 10/2014 | Epis et al. |
| 2015/0012509 A1 | 1/2015 | Kirn |
| 2015/0074050 A1 | 3/2015 | Landau et al. |
| 2015/0112641 A1 | 4/2015 | Faraj |
| 2015/0188715 A1 | 7/2015 | Castellucci et al. |
| 2015/0256617 A1 | 9/2015 | Klose et al. |
| 2015/0301861 A1 | 10/2015 | LaChiusa et al. |
| 2016/0092476 A1 | 3/2016 | Stojanovic et al. |
| 2016/0246809 A1 | 8/2016 | Ramano et al. |
| 2017/0220403 A1 | 8/2017 | Maag |
| 2017/0249132 A1 | 8/2017 | Andrews et al. |
| 2017/0337124 A1 | 11/2017 | Maag et al. |
| 2017/0351989 A1 | 12/2017 | Langdon |
| 2017/0357562 A1 | 12/2017 | Rickard et al. |
| 2018/0032575 A1 | 2/2018 | Pryce et al. |
| 2018/0032706 A1 | 2/2018 | Fox et al. |
| 2019/0286538 A1 | 9/2019 | Rickard et al. |

FOREIGN PATENT DOCUMENTS

| | | |
|---|---|---|
| EP | 1566758 | 8/2005 |
| EP | 1647908 | 4/2006 |
| EP | 1962222 | 8/2008 |
| EP | 2551799 | 1/2013 |
| EP | 2634745 | 9/2013 |
| EP | 2743839 | 6/2014 |
| EP | 2778986 | 9/2014 |
| EP | 2897051 | 7/2015 |
| EP | 3255568 | 12/2017 |
| GB | 2366498 | 3/2002 |
| GB | 2508503 | 1/2015 |
| GB | 2517582 | 2/2015 |
| GB | 2508293 | 4/2015 |
| NL | 2013134 | 1/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2005/010685 | 2/2005 |
| WO | WO 2010/030917 | 3/2010 |
| WO | WO 2011/017289 | 5/2011 |
| WO | WO 2011/071833 | 6/2011 |
| WO | WO 2012/079836 | 6/2012 |
| WO | WO 2013/067077 | 5/2013 |

OTHER PUBLICATIONS

U.S. Appl. No. 13/831,791, filed Mar. 15, 2013, Final Office Action, dated Aug. 6, 2015.
U.S. Appl. No. 13/827,627, filed Mar. 14, 2013, Final Office Action, dated Aug. 26, 2015.
U.S. Appl. No. 14/019,534, filed Sep. 5, 2013, First Office Action Interview, dated Sep. 4, 2015.
U.S. Appl. No. 13/411,291, filed Mar. 2, 2012, Interview Summary, dated Oct. 1, 2015.
U.S. Appl. No. 14/025,653, filed Sep. 12, 2013, First Office Action Interview, dated Oct. 6, 2015.
U.S. Appl. No. 14/254,757, filed Apr. 16, 2014, Notice of Allowance, dated Sep. 10, 2014.
U.S. Appl. No. 13/767,779, filed Feb. 14, 2013, Notice of Allowance, dated Mar. 17, 2015.
U.S. Appl. No. 14/304,741, filed Jun. 13, 2014, Notice of Allowance, dated Apr. 7, 2015.
U.S. Appl. No. 13/657,656, filed Oct. 22, 2012, Office Action, dated Oct. 7, 2014.
U.S. Appl. No. 14/304,741, filed Jun. 13, 2014, Office Action Interview, dated Aug. 6, 2014.
U.S. Appl. No. 13/831,791, filed Mar. 15, 2013, Final Office Action, dated Mar. 4, 2015.
U.S. Appl. No. 13/608,864, filed Sep. 10, 2012, First Office Action Interview, dated Mar. 17, 2015.
U.S. Appl. No. 13/657,635, filed Oct. 22, 2012, Office Action, dated Mar. 30, 2015.
U.S. Appl. No. 13/657,656, filed Oct. 22, 2012, Final Office Action, dated May 6, 2015.
U.S. Appl. No. 13/608,864, filed Sep. 10, 2012, Final Office Action, dated Jun. 8, 2015.
U.S. Appl. No. 13/411,291, filed Mar. 2, 2012, Office Action, dated Jul. 15, 2015.
U.S. Appl. No. 13/827,627, filed Mar. 4, 2013, Final Office Action, dated Mar. 2, 2015.
U.S. Appl. No. 14/304,741, filed Jun. 13, 2014, Final Office Action, dated Mar. 3, 2015.
U.S. Appl. No. 15/225,437, filed Aug. 1, 2016, Pre-Interview First Office Action, dated Nov. 17, 2016.
U.S. Appl. No. 15/225,738, filed Aug. 1, 2016, First Office Action Interview, dated Nov. 15, 2016.
U.S. Appl. No. 15/225,437, filed Aug. 1, 2016, First Office Action Interview, dated May 3, 2017.
U.S. Appl. No. 14/877,229, filed Oct. 7, 2015, Office Action, dated Mar. 22, 2016.
U.S. Appl. No. 14/877,229, filed Oct. 7, 2015, Notice of Allowance, dated Jul. 19, 2017.
U.S. Appl. No. 13/657,635, filed Oct. 22, 2012, Final Office Action, dated Oct. 7, 2015.
U.S. Appl. No. 14/77,229, filed Oct. 7, 2015, Final Office Action, dated Oct. 13, 2016.
U.S. Appl. No. 15/225,437, filed Aug. 1, 2016, Office Action, dated Jan. 9, 2018.
U.S. Appl. No. 15/225,437, filed Aug. 1, 2016, Final Office Action, dated Aug. 18, 2017.
U.S. Appl. No. 14/877,229, filed Oct. 7, 2015, Office Action, dated Feb. 28, 2017.
U.S. Appl. No. 14/877,229, filed Oct. 7, 2015, Interview Summary, dated Jul. 16, 2017.
U.S. Appl. No. 14/887,071, filed Oct. 19, 2015, Pre Office Action Interview, dated Mar. 21, 2016.
U.S. Appl. No. 15/671,423, filed Aug. 8, 2017, Notice of Allowance, dated May 13, 2019.
U.S. Appl. No. 15/671,423, filed Aug. 8, 2017, Office Action, dated Feb. 21, 2019.
"A Quick Guide to UniProtKB Swiss-Prot & TrEMBL," Sep. 2011, pp. 2.

(56) References Cited

OTHER PUBLICATIONS

"A Tour of Pinboard," <http://pinboard.in/tour> as printed May 15, 2014 in 6 pages.
Ballesteros et al., "Batching: A Design Pattern for Efficient and Flexible Client/Server Interaction," Transactions on Pattern Languages of Programming, Springer Berlin Heildeberg, 2009, pp. 48-66.
Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Donjerkovic et al., "Probabilistic Optimization of Top N Queries," Proceedings of the 25th VlLDB Conference, Edinburgh, Scotland, 1999, pp. 411-422.
Fang et al., "Computing Iceberg Queries Efficiently," Proceedings of the 24th VLDB Conference New York, 1998, pp. 299-310.
"Frequently Asked Questions about Office Binder 97," http://web.archive.org/web/20100210112922/http://support.microsoft.com/kb/843147 printed Dec. 18, 2006 in 5 pages.
Geiger, Jonathan G., "Data Quality Management, The Most Critical Initiative You Can Implement," Data Warehousing, Management and Quality, Paper 098-29, SUGI 29, Intelligent Solutions, Inc., Bounder, CO, pp. 14, accessed Oct. 3, 2013.
Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," CODE Project, Mar. 13, 2008. Retrieved on Jan. 30, 2015 from the internet: <http://www.codeproject.com/Articles/7335/An-extensible-math-expression-parser-with-plug-ins>.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Johnson, Steve, "Access 2013 on demand," Access 2013 on Demand, May 9, 2013, Que Publishing.
Kahan et al., "Annotea: an Open RDF Infastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51-55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Perry, Frances, "Sneak Peek: Google Cloud Dataflow, a Cloud-Native Data Processing Service," Jun. 26, 2014, pp. 1-5.
Prabhakar, Arvind, "Apache Flume," Architecture of Flume NG, Dec. 9, 2011, pp. 1 -14.
Official Communication for Australian Patent Application No. 2014203669 dated Jan. 21, 2016.
Official Communication in New Zealand Application No. 627962 dated Aug. 5, 2014.
Official Communication for European Patent Application No. 18190278.4 dated Nov. 29, 2018.
Pythagoras Communications Ltd., "Microsoft CRM Duplicate Detection," Sep. 13, 2011, https://www.youtube.com/watch?v=j-7Qis0D0Kc.
Russell et al., "NITELIGHT: A Graphical Tool for Semantic Query Construction," 2008, pp. 10.
Sigrist, et al., "PRPSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008), Acitrezza, Catania, Italy, Sep. 29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
"The FASTA Program Package," fasta-36.3.4, Mar. 25, 2011, pp. 29.
VVikipedia, "Machine Code" p. 1-5, printed Aug. 11, 2014.
Wollrath et al., "A Distributed Object Model for the Java System," Proceedings of the 2nd Conference on USENEX, Conference on Object-Oriented Technologies (COOTS), Jun. 17, 1996, pp. 219-231.
Notice of Acceptance for New Zealand Patent Application No. 622485 dated Nov. 24, 2014.
Notice of Acceptance for New Zealand Patent Application No. 616212 dated Jan. 23, 2015.
Notice of Acceptance for New Zealand Patent Application No. 616299 dated Apr. 7, 2015.
Official Communication for New Zealand Patent Application No. 622414 dated Mar. 24, 2014.
Official Communication for New Zealand Patent Application No. 622484 dated Apr. 2, 2014.
Official Communication for New Zealand Patent Application No. 627061 dated Jul. 14, 2014.
Official Communication for European Patent Application No. 14159175.0 dated Jul. 17, 2014.
Official Communication for European Patent Application No. 14159629.6 dated Jul. 31, 2014.
Official Communication for European Patent Application No. 14159629.6 dated Sep. 22, 2014.
Official Communication for Canadian Patent Application No. 2807899 dated Oct. 24, 2014.
Official Communication for New Zealand Patent Application No. 622485 dated Nov. 21, 2014.
Official Communication for Great Britain Patent Application No. 1404574.4 dated Dec. 18, 2014.
Official Communication for Great Britain Patent Application No. 1411984.6 dated Dec. 22, 2014.
Official Communication for Australian Patent Application No. 2013237710 dated Jan. 16, 2015.
Official Communication for New Zealand Patent Application No. 616299 dated Jan. 26, 2015.
Official Communication for Australian Patent Application No. 2013237658 dated Feb. 2, 2015.

(56) References Cited

OTHER PUBLICATIONS

Official Communication for Australian Patent Application No. 2014201580 dated Feb. 27, 2015.
Official Communication for German Patent Application No. 10 2013 221 057.4 dated Mar. 23, 2015.
Official Communication for German Patent Application No. 10 2013 221 052.3 dated Mar. 24, 2015.
Official Communication for European Patent Application No. 14199180.2 dated Aug. 31, 2015.
Official Communication for Netherlands Patent Application No. 2013134 dated Apr. 20, 2015.
Official Communication for Canadian Patent Application No. 2829266 dated Apr. 28, 2015.
Official Communication for Canadian Patent Application No. 2828264 dated Apr. 28, 2015.
Official Communication for Australian Patent Application No. 2014203669 dated May 29, 2015.
Official Communication for European Patent Application No. 14199180.2 dated Jun. 22, 2015.
Official Communication for Canadian Patent Application No. 2807899 dated Jul. 20, 2015.
Official Communication for Netherlands Patent Application No. 2011613 dated Aug. 13, 2015.
Official Communication for Netherlands Patent Application No. 2011627 dated Aug. 14, 2015.
Official Communication for European Patent Application No. 17183768.5 dated Oct. 19, 2017.
"LabKey Server 16.2," Jul. 15, 2016, retrieved from https://www.labkey.org/Documentation/Archive/16.2/project-begin.view? on Oct. 4, 2017.
Official Communication for European Patent Application No. 17183768 dated Feb. 1, 2019.
"LabKey Server Release Schedule," Jul. 15, 2016, retrieved from https://www.labkey.org/Documentation/wiki-page.view?name=releaseSchedule on Oct. 2, 2017.

Status Table 805

| Pipeline | 2015-01-01 | 2015-01-02 | 2015-01-03 | 2015-01-04 | 2015-01-05 | 2015-01-06 |
|---|---|---|---|---|---|---|
| email | Warning | Critical | Critical | Critical | Warning | OK |
| credit card | Critical | Critical | OK | Critical | Critical | Critical |
| employee | Critical | OK | OK | Warning | Critical | Critical |
| proxy | OK | OK | OK | Warning | OK | Critical |
| weblog | Warning | OK | OK | OK | OK | Critical |

General Status Interface 800

Display Option Widgets 806

View Widget 801: Default View

Start Date Widget 802: 2015-01-01

End Date Widget 803: 2015-01-06

Submit Widget 804: SUBMIT

Test Status Interface 900

EMAIL
2015-01-01

| Tests | Status |
|---|---|
| import_failures | OK |
| data_landing_volume | OK |
| data_landing_delay | OK |
| data_landing_file_count | Warning |

Test Status Table 901

PLUGGABLE FAULT DETECTION TESTS FOR DATA PIPELINES

PRIORITY CLAIM/CROSS REFERENCES

This application claims the benefit as a Continuation of application Ser. No. 15/671,423 filed Aug. 8, 2017; which claims the benefit as a Continuation of application. Ser. No. 14/877,229, filed Oct. 7, 2015 now U.S. Pat. No. 9,772,934 issued Sep. 26, 2017; the entire contents of which is hereby incorporated by reference as if fully set forth herein, under 35 U.S.C. § 120; which claims priority to U.S. Provisional Application No. 62/218,399, filed Sep. 14, 2015. This application is related to U.S. application Ser. No. 14/533,433, filed Nov. 5, 2014, now U.S. Pat. No. 9,229,952 issued Jan. 5, 2016, which is hereby incorporated by reference as though fully stated herein.

TECHNICAL FIELD

The disclosed technologies relate generally to data pipeline computer systems and, more particularly, to a fault detection computer system and methodology for monitoring data pipelines.

BACKGROUND

Computers are very powerful tools for processing data. A computerized data pipeline is a useful mechanism for processing large amounts of data. A typical data pipeline is an ad-hoc collection of computer software scripts and programs for processing data extracted from "data sources" and for providing the processed data to "data sinks". As an example, a data pipeline for a large insurance company that has recently acquired a number of smaller insurance companies may extract policy and claim data from the individual database systems of the smaller insurance companies, transform and validate the insurance data in some way, and provide validated and transformed data to various analytical platforms for assessing risk management, compliance with regulations, fraud, etc.

Between the data sources and the data sinks, a data pipeline system is typically provided as a software platform to automate the movement and transformation of data from the data sources to the data sinks. In essence, the data pipeline system shields the data sinks from having to interface with the data sources or even being configured to process data in the particular formats provided by the data sources. Typically, data from the data sources received by the data sinks is processed by the data pipeline system in some way. For example, a data sink may receive data from the data pipeline system that is a combination (e.g., a join) of data of from multiple data sources, all without the data sink being configured to process the individual constituent data formats.

One purpose of a data pipeline system is to execute data transformation steps on data obtained from data sources to provide the data in format expected by the data sinks. A data transformation step may be defined as a set of computer commands or instructions which, when executed by the data pipeline system, transforms one or more input datasets to produce one or more output or "target" datasets. Data that passes through the data pipeline system may undergo multiple data transformation steps. Such a step can have dependencies on the step or steps that precede it. One example of a computer system for carrying out data transformation steps in a data pipeline is the well-known MapReduce system. See, e.g., Dean, Jeffrey, et al., "MapReduce: Simplified Data Processing on Large Clusters", Google, Inc., 2004.

Often, data pipeline systems are maintained "by hand". That is, a software engineer or system administrator is responsible for configuring the system so that data transformation steps are executed in the proper order and on the correct datasets. If a data transformation step needs to be added, removed, or changed, the engineer or administrator typically must reconfigure the system by manually editing control scripts or other software programs. Similarly, the engineer or administrator also "hand crafts" a variety of tests to validate the transformed datasets and ensure that no fault has occurred within the data pipeline system. For example, a validation may involve determining that the transformed dataset adheres to a proper format/schema and that data has not been lost in the process. Since the validation needs for a particular data pipeline system are often unique to a particular business client and/or pipeline, it can be very difficult to reuse code implementing fault detection tests across multiple software deployments. Furthermore, in many cases, the engineer maintaining the data pipeline system is maintained by a third party business that employs many engineers who manage many different pipelines for many different clients. As a result, the lack of ability to share fault detection tests between software deployments represents a significant portion of human resource time that could be better spent optimizing the data pipeline system or working on new data pipeline systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The appended claims serve as a summary of this disclosure.

BRIEF DESCRIPTION OF THE DRAWINGS

FIG. 8 illustrates an example user interface for displaying a general status table according to an embodiment.

FIG. 9 illustrates an example user interface for displaying a test status table according to an embodiment.

DETAILED DESCRIPTION

Figure 1:
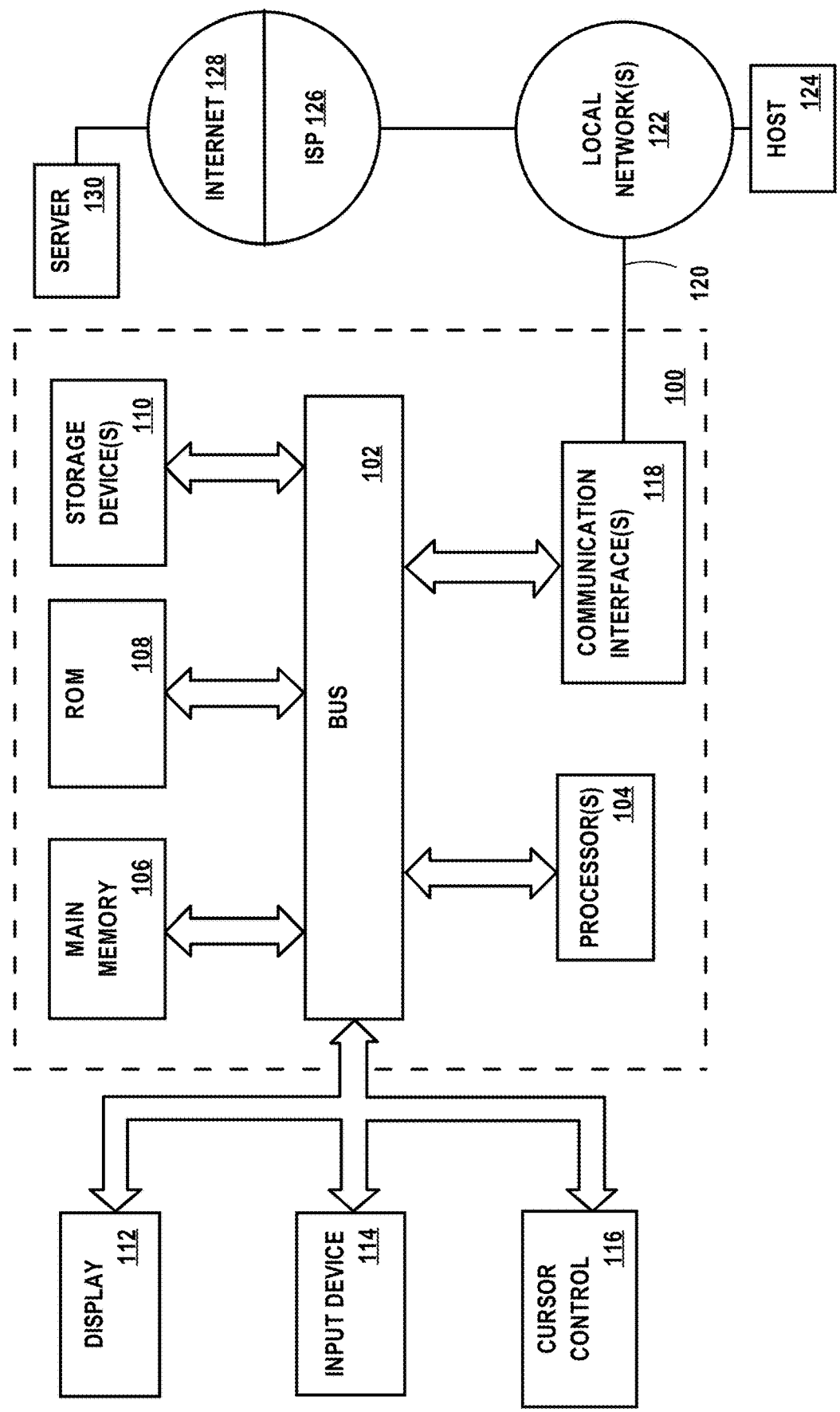
FIG. 1 is a very general block diagram of an example computing device which may be used for implementing the disclosed technologies.

In the following description, for the purposes of explanation, numerous specific details are set forth in order to provide a thorough understanding of the disclosed technologies. It will be apparent, however, that the disclosed technologies can be practiced without these specific details. In other instances, well-known structures and devices are shown in block diagram form in order to avoid unnecessarily obscuring the disclosed technologies. As to the flowcharts, each block within the flowcharts represents both a method step and an apparatus element for performing the method step. Depending upon the requirements of the particular implementation at hand, the corresponding apparatus element may be configured in hardware, software, firmware or combinations thereof.

Embodiments are described herein according to the following outline:
1.0 General Overview
2.0 Basic Computing Environment
   2.1 Basic Computing Device
   2.2 Basic Software System
3.0 Example Distributed Computing Environment
   3.1 Data Sources
   3.2 Data Sinks
   3.3 Data Pipeline System
   3.4 Fault Detection System
      3.4.1 Pipeline Communication Interface
      3.4.2 Data Collection Scheduler
      3.4.3 Data Storage Subsystem
      3.4.4 Data Analysis Subsystem
      3.4.5 Plugins
      3.4.6 Analysis Storage Subsystem
      3.4.7 Analysis Aggregator
      3.4.8 Client Communication Interface
   3.5 Client Application
4.0 Example Plugin Tests
   4.1 Schema Validation Tests
   4.2 Volume Tests
   4.3 Log File and/or Alert Tests
   4.4 Utilizing Machine Learning in Plugin Tests
5.0 Example User Interfaces
   5.1 General Status Interface
   5.2 Test Status Interface
   5.3 Alert Interface
   5.4 Plugin Configuration Interface
6.0 Example Method for Detecting Faults Using Plugins
7.0 Extensions and Alternatives
8.0 Additional Disclosure 1.0 General Overview Given the deficiencies of current manual and ad-hoc approaches for implementing and managing fault detection tests for a data pipeline system, a more automated and integrated approach would clearly be preferable. In accordance with an embodiment of the disclosed technologies, pluggable fault detection tests for a data pipeline system are provided.

As mentioned above, current techniques for managing fault detection tests for data pipelines result in duplicated work due to the inability to efficiently share code between software deployments. As a result, engineers or administrators are often forced to write testing frameworks from the ground up for each new project. Discussed herein are embodiments of a fault detect system which allows engineers or administrators to create modular plugins which represent the logic for various fault detection tests and can be shared among different software deployments. A plugin represents a software component (such as a bundle of instructions and/or metadata) that adds a specific feature to an existing software application, in this case the fault detection system. For example, a plugin can be written that causes the fault detection system to monitor email traffic and report if the volume of emails drops below a particular threshold. That plugin can then be reused for other software deployments, perhaps for different clients that also have an email pipeline that needs to be monitored and checked for faults.

However, each software deployment is unique and the exact tests performed for one software deployment might not carry over exactly to another software deployment. For example, the email detection test described above may have been installed for a client who is a corporation with thousands of employees and generally receives a large volume of email traffic. As a result, the threshold may be set relatively high since this would be typical of traffic expected to be received from this particular pipeline. If the same plugin were to be uploaded to monitor an email pipeline for a different client with only a hundred employees, the high threshold would cause a large number of false positives. Thus, in some embodiments, the plugins are supported an application programming interface (API) that allows the designer of the plugin to specify configurable arguments (referred to as "configuration points") that allow the base logic of the plugin to be tailored to the pipeline or pipelines for which the plugin will be providing tests. For example, upon being loaded into the fault detection system, the plugin may cause the fault detection system to collect configurable arguments, such as the name that will be used for the plugin in this software deployment, name/names of the data set(s) to monitor, which pipeline to monitor, how often the tests should be performed, what the thresholds should be, the implementation of specific functions/methods, and so forth. As a result, fault detection tests written using the modular plugin architecture can be easily shared between different software deployments by providing the base logic for the test and specifying the "configuration points" that will need to be customized on a software deployment by software deployment basis. Thus, most of the work done in coding and developing the test can be reused across software deployments, resulting in increased efficiency.

In some embodiments, the fault detection system is configured to communicate with the user through a web interface. For example, the fault detection system may include a presentation or interface component that provides interfaces to the user by generating web pages and communicating those web pages to a client application (such as a browser or browser-enabled application) executing on a client computer of the user. However, in other embodiments, other types of interfaces could be used instead of or in addition to a web interface, such as a command line interface.

In an embodiment, the fault detection system is configured to provide an interface for viewing the status of the monitored pipelines for one or more periods of time. The user, by selecting specified widgets within the interface (such as buttons, dropdown menus, forms, hyperlinks, and so forth) can drill into the status to display the outcome of each individual test performed by the plugins. In addition, the user can further drill into the status of an individual test to display more detailed information, such as a detailed status comment and exact time the fault occurred, as well as access widgets providing the ability to silence alerts meeting certain criteria (such as silencing alerts for a particular time, for a particular pipeline, for a particular dataset, and so forth).

In some embodiments, the fault detection system is also configured to provide interfaces for uploading plugins which define various configuration points. The fault detection system, upon receiving the plugin, generates a user interface to collect information for the configuration points from the user. Once configured, the fault detection system then executes the test(s) defined by the plugin based on a scheduled defined by the plugin or supplied as a configuration point.

In some embodiments, the plugins are configured to utilize machine learning techniques to determine whether a fault has occurred within a data pipeline. For example, a plugin may be configured with a machine learning technique that is trained based on historical activity associated with the pipeline to learn a function that predicts one or more metrics and/or classifications. For instance, using a plugin for the email pipeline as an example, the plugin may analyze the volume of email traffic received from the data sources over the last few years and train an artificial neural network that predicts what the volume should be for the current day. If the prediction differs from the volume of traffic actually monitored for the current day by more than a threshold amount, the plugin can determine that a fault has occurred. The previous example uses a neural network as the machine learning technique, but any number of well-known machine learning techniques can be utilized by a plugin, such as a Naive Bayes classifier, a Support Vector Machine (SVM), a Markov model, Latent Dirichlet Allocation, and so forth. The modular plugin architecture can support virtually any machine learning technique, but the most effective technique to use depends on the particular software deployment and test being performed and could vary drastically from implementation to implementation.

In some embodiments, the plugin is configured to retrain itself in response to receiving an explicit command to retrain, for example sent by an administrator through an interface provided by the fault detection system. However, in other embodiments, the plugin is configured to collect new data as time progresses and retrain itself automatically. For example, the plugin may be configured as a "batch learner" that retrains after collecting a threshold quantity of new data or as an "online" learning that adjusts its predictive function in response to collecting each new data point.

2.0 Basic Computing Environment

The disclosed technologies may be implemented on one or more computing devices. Such a computing device may be implemented in various forms including, but not limited to, a client, a server, a network device, a mobile device, a cell phone, a smart phone, a laptop computer, a desktop computer, a workstation computer, a personal digital assistant, a blade server, a mainframe computer, and other types of computers. The computing device described below and its components, including their connections, relationships, and functions, is meant to be exemplary only, and not meant to limit implementations of the disclosed technologies described in this specification. Other computing devices suitable for implementing the disclosed technologies may have different components, including components with different connections, relationships, and functions.

2.1 Basic Computing Device

FIG. 1 is a block diagram that illustrates an example of a computing device 100 suitable for implementing the disclosed technologies. Computing device 100 includes bus 102 or other communication mechanism for addressing main memory 106 and for transferring data between and among the various components of device 100. Computing device 100 also includes one or more hardware processors 104 coupled with bus 102 for processing information. A hardware processor 104 may be a general purpose microprocessor, a system on a chip (SoC), or other processor suitable for implementing the described technologies.

Main memory 106, such as a random access memory (RAM) or other dynamic storage device, is coupled to bus 102 for storing information and instructions to be executed by processor(s) 104. Main memory 106 also may be used for storing temporary variables or other intermediate information during execution of instructions to be executed by processor(s) 104. Such instructions, when stored in non-transitory storage media accessible to processor(s) 104, render computing device 100 into a special-purpose computing device that is customized to perform the operations specified in the instructions.

Computing device 100 further includes read only memory (ROM) 108 or other static storage device coupled to bus 102 for storing static information and instructions for processor(s) 104.

One or more mass storage devices 110 are coupled to bus 102 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 110 (e.g., the main hard disk for the device) stores a body of program and data for directing operation of the computing device, including an operating system, user application programs, driver and other support files, as well as other data files of all sorts.

Computing device 100 may be coupled via bus 102 to display 112, such as a liquid crystal display (LCD) or other electronic visual display, for displaying information to a computer user. Display 112 may also be a touch-sensitive display for communicating touch gesture (e.g., finger or stylus) input to processor(s) 104.

An input device 114, including alphanumeric and other keys, is coupled to bus 102 for communicating information and command selections to processor 104.

Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computing device 100 may implement the methods described herein using customized hard-wired logic, one or more application-specific integrated circuits (ASICs), one or more field-programmable gate arrays (FPGAs), firmware, or program logic which, in combination with the computing device, causes or programs computing device 100 to be a special-purpose machine.

Methods disclosed herein may also be performed by computing device 100 in response to processor(s) 104 executing one or more sequences of one or more instructions contained in main memory 106. Such instructions may be read into main memory 106 from another storage medium, such as storage device(s) 110. Execution of the sequences of instructions contained in main memory 106 causes processor(s) 104 to perform the process steps described herein. In alternative embodiments, hard-wired circuitry may be used in place of or in combination with software instructions.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor(s) 104 for execution. For example, the instructions may initially be carried on a magnetic disk or solid-state drive of a remote computer. The remote computer can load the instructions into its dynamic memory and send the instructions over a telephone line using a modem. A modem local to computing device 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor(s) 104 retrieves and executes the instructions. The instructions received by main memory 106 may optionally be stored on storage device(s) 110 either before or after execution by processor(s) 104.

Computing device 100 also includes one or more communication interface(s) 118 coupled to bus 102. A communication interface 118 provides a two-way data communication coupling to a wired or wireless network link 120 that is connected to a local network 122 (e.g., Ethernet network, Wireless Local Area Network, cellular phone network, Bluetooth wireless network, or the like). Communication interface 118 sends and receives electrical, electromagnetic, or optical signals that carry digital data streams representing various types of information. For example, communication interface 118 may be a wired network interface card, a wireless network interface card with an integrated radio antenna, or a modem (e.g., ISDN, DSL, or cable modem).

Network link(s) 120 typically provide data communication through one or more networks to other data devices. For example, a network link 120 may provide a connection through a local network 122 to a host computer 124 or to data equipment operated by an Internet Service Provider (ISP) 126. ISP 126 in turn provides data communication services through the world wide packet data communication network now commonly referred to as the "Internet" 128. Local network(s) 122 and Internet 128 use electrical, electromagnetic or optical signals that carry digital data streams. The signals through the various networks and the signals on network link(s) 120 and through communication interface(s) 118, which carry the digital data to and from computing device 100, are example forms of transmission media.

Computing device 100 can send messages and receive data, including program code, through the network(s), network link(s) 120 and communication interface(s) 118. In the Internet example, a server 130 might transmit a requested code for an application program through Internet 128, ISP 126, local network(s) 122 and communication interface(s) 118.

The received code may be executed by processor 104 as it is received, and/or stored in storage device 110, or other non-volatile storage for later execution.

2.2 Basic Software System

Figure 2:
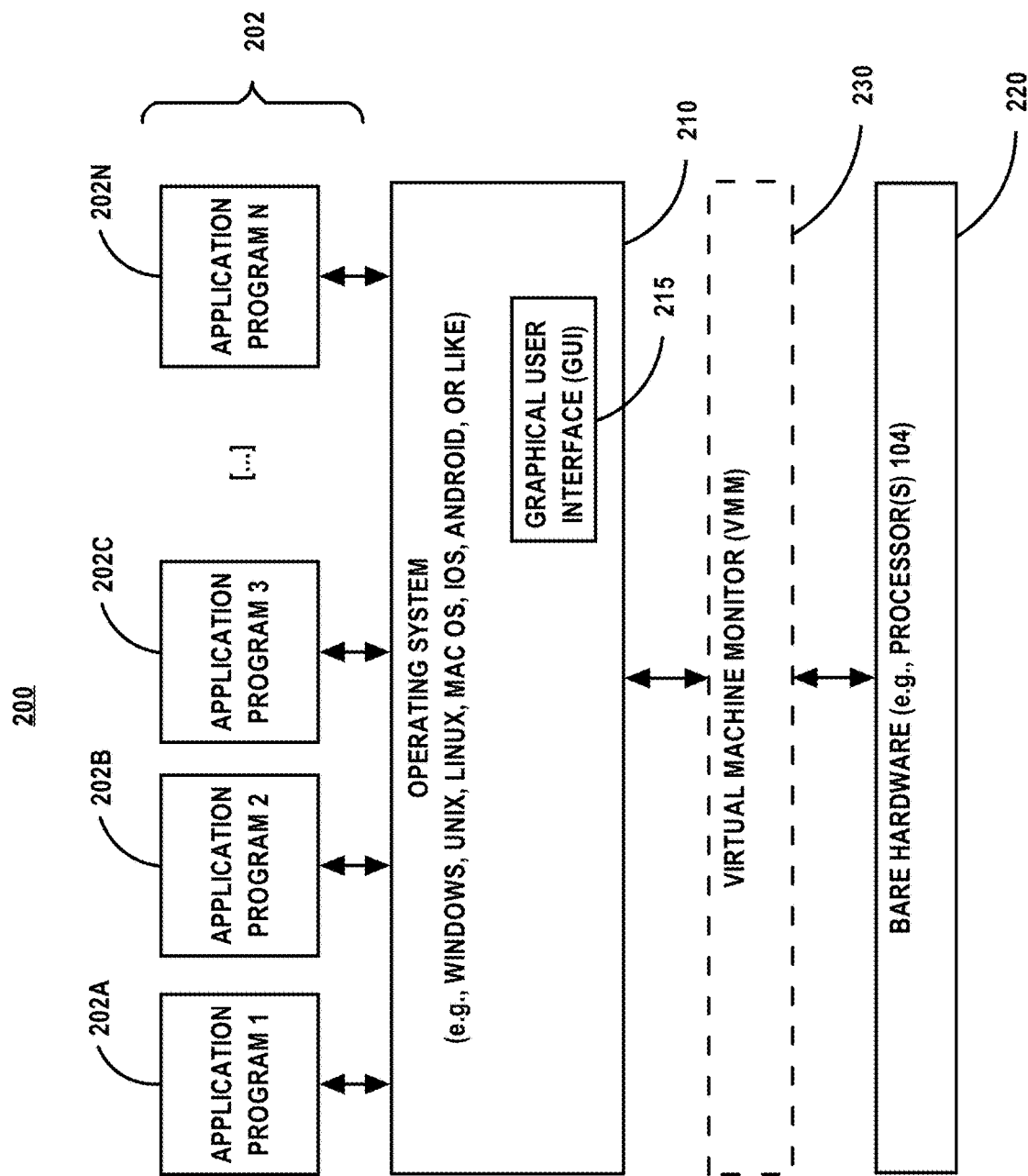
FIG. 2 is a block diagram of an example software system for controlling the operation of the computing device of FIG. 1.

FIG. 2 is a block diagram of a software system for controlling the operation of computing device 100. As shown, a computer software system 200 is provided for directing the operation of the computing device 100. Software system 200, which is stored in system memory (RAM) 106 and on fixed storage (e.g., hard disk) 110, includes a kernel or operating system (OS) 210. The OS 210 manages low-level aspects of computer operation, including managing execution of processes, memory allocation, file input and output (I/O), and device I/O. One or more application programs, such as client application software or "programs" 202 (e.g., 202A, 202B, 202C . . . 202N) may be "loaded" (i.e., transferred from fixed storage 110 into memory 106) for execution by the system 200. The applications or other software intended for use on the device 100 may also be stored as a set of downloadable computer-executable instructions, for example, for downloading and installation from an Internet location (e.g., Web server).

Software system 200 may include a graphical user interface (GUI) 215, for receiving user commands and data in a graphical (e.g., "point-and-click" or "touch gesture") fashion. These inputs, in turn, may be acted upon by the system 200 in accordance with instructions from operating system 210 and/or client application module(s) 202. The GUI 215 also serves to display the results of operation from the OS 210 and application(s) 202, whereupon the user may supply additional inputs or terminate the session (e.g., log off).

The OS 210 can execute directly on the bare hardware (e.g., processor(s) 104) 220 of device 100. Alternatively, a hypervisor or virtual machine monitor (VMM) 230 may be interposed between the bare hardware 220 and the OS 210. In this configuration, VMM 230 acts as a software "cushion" or virtualization layer between the OS 210 and the bare hardware 220 of the device 100.

VMM 230 instantiates and runs virtual machine instances ("guest machines"). Each guest machine comprises a "guest" operating system, such as OS 210, and one or more applications, such as applications 202, designed to execute on the guest operating system. The VMM 230 presents the guest operating systems with a virtual operating platform and manages the execution of the guest operating systems. In some instances, the VMM 230 may allow a guest operating system to run as through it is running on the bare hardware 220 of the device 100 directly. In these instances, the same version of the guest operating system configured to execute on the bare hardware 104 directly may also be able to execute on VMM 230 without modification or reconfiguration. In other words, VMM 230 may provide full hardware and CPU virtualization to a guest operating system in some instances. In other instances, a guest operating system may be specially designed or configured to execute on VMM 230 for efficiency. In these instances, the guest operating system is "aware" that it executes on a virtual machine monitor. In other words, VMM 230 may provide para-virtualization to a guest operating system in some instances.

The above-described computer hardware and software are presented for purpose of illustrating basic underlying computer components that may be employed for implementing the disclosed technologies. The disclosed technologies, however, are not limited to any particular computing environment or computing device configuration. Instead, the disclosed technologies may be implemented in any type of system architecture or processing environment capable of supporting the disclosed technologies presented in detail below.

3.0 Example Distributed Computing Environment

Figure 3:
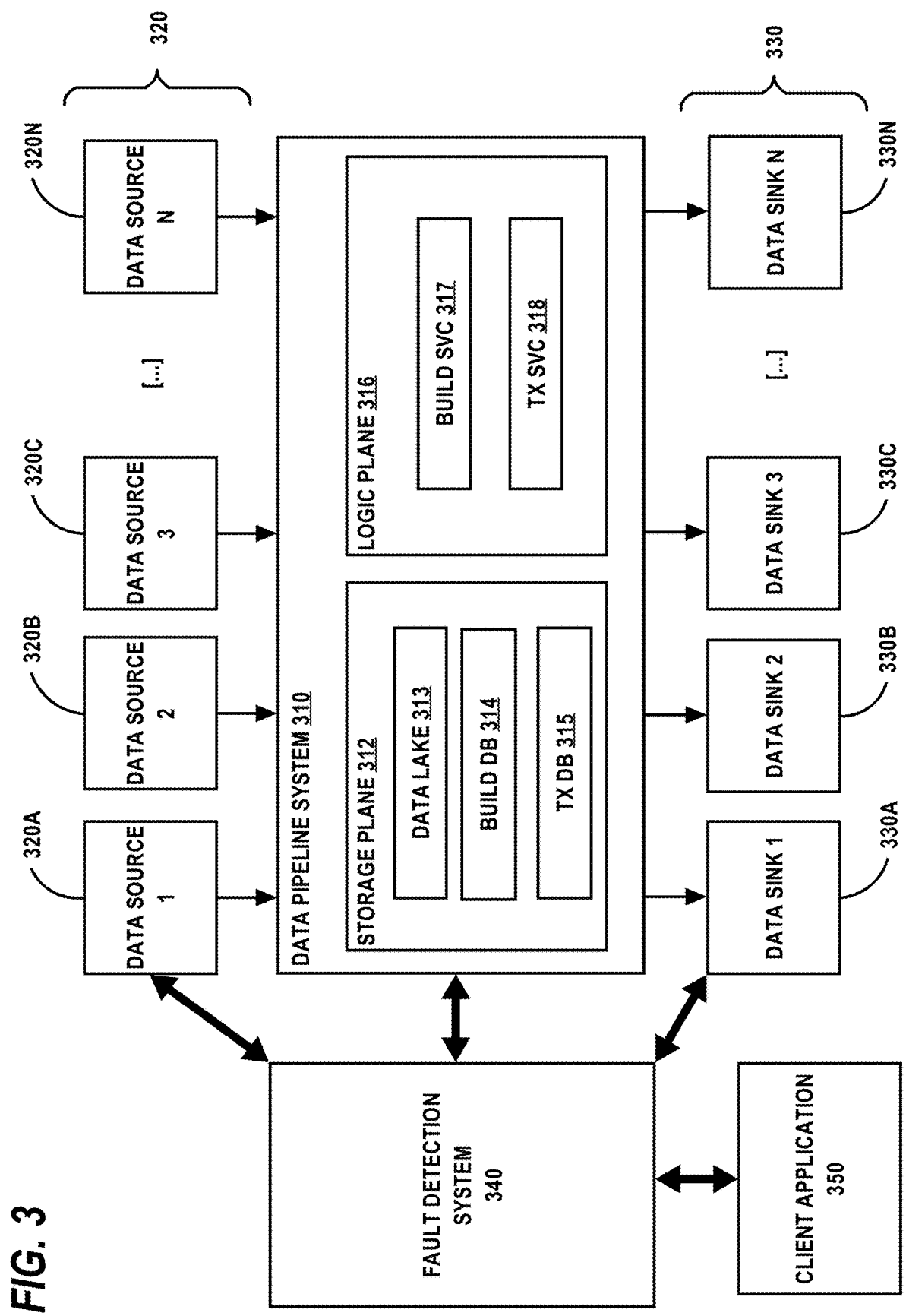
FIG. 3 is a block diagram of an example distributed computing environment in which the disclosed technologies may be implemented.

While the disclosed technologies may operate within a single standalone computing device (e.g., device 100 of FIG. 1), the disclosed technologies may be implemented in a distributed computing environment. FIG. 3 is a block diagram of a distributed computing environment 300 in which the disclosed technologies may be implemented.

As shown, environment 300 comprises a data pipeline system 310 that implements one or more embodiments of the disclosed technologies, one or more data sources 320 (e.g., 320A, 320B, 302C . . . 320N) that provide data to the data pipeline system 310, one or more data sinks 330 (e.g., 330A, 330B, 330C . . . 330N) that consume data from the data pipeline system 310, a fault detection system 340 that monitors the pipelines implemented by the data pipeline system 310 to determine whether faults have occurred, and a client application 350 through which an engineer or administrator can submit commends, obtain information, and/or otherwise interact with the fault detection system 340.

In general, the data sources 320 provide data to the data pipeline system 310 and the data sinks 330 consume data from the data pipeline system 310. The data pipeline system 310 stores data it obtains from the data sources 320 and data it provides to data sinks 330 in datasets, which are named collections of data. In some embodiments, datasets are immutable and versioned to facilitate tracing of dataset data through the data pipeline system 310 including historical (i.e., not current) versions of dataset data. In an embodiment, the current version of a dataset is the latest (most recent) version of the dataset. Details of an example pipeline system that could be used to implement data pipeline system 310 are provided in "History Preserving Data Pipeline System and Method" by Meacham et al., filed Nov. 5, 2014, U.S. application Ser. No. 14/533,433.

In many cases, data provided by a data source 320 to the data pipeline system 310 that is consumed by a data sink 330 from the data pipeline system 310 is not consumed by the data sink 330 in the same data format in which it was provided. In other words, the data pipeline system 310 may transform data provided by a data source 320 in one or more data transformation steps before it is provided to a data sink 330.

A data transformation step generally involves converting data in a "source" data format to data in a "target" data format. Such a data transformation step may involve mapping data elements of the data in the source data format to data elements in the target data format. Such mapping can be one-to-one, one-to-many, many-to-one, or many-to-many. In an embodiment, a data transformation step on dataset data is carried out, at least in part, with a data analytics cluster computing instance such as, for example, an APACHE HADOOP MAPREDUCE instance, an APACHE SPARK instance, an APACHE HIVE instance, or the like.

Figure 4:
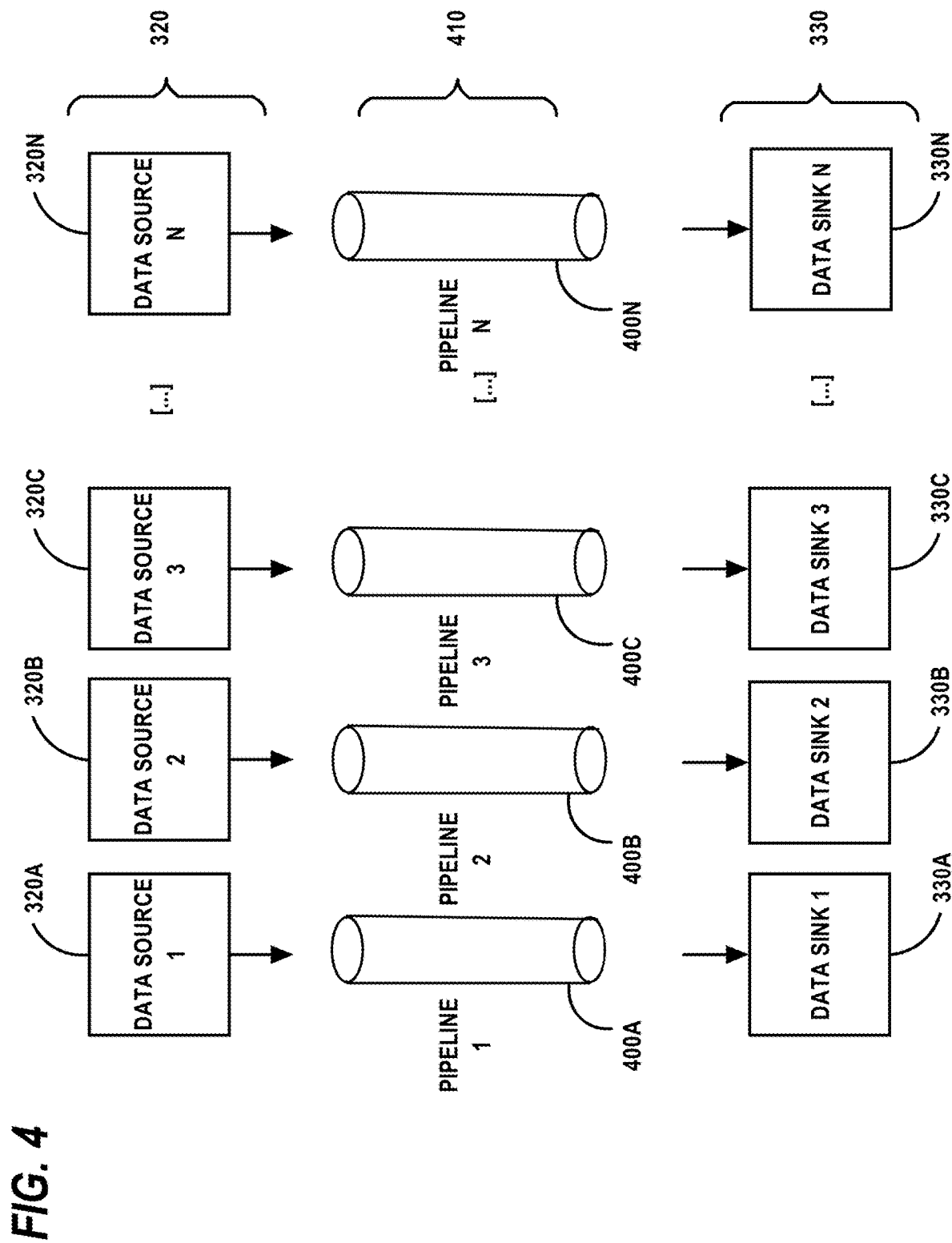
FIG. 4 is a block diagram representing a logical view of a data pipeline system according to an embodiment.

FIG. 4 illustrates a logical view of the data pipeline system 310 according to an embodiment. In FIG. 4, the data from the data sources 320 are funneled into the data sinks 330 through one or more logical pipelines 410. As mentioned earlier, each of the pipelines 410 (400A, 400B, 400C, . . . , 400N) can apply transformations to the data from their respective data sources before making the transformed data available to their respective data sinks. In many cases, each of the pipelines 410 represents a particular entity or type of data source. For example, data source 1 may represent a repository of emails, data source 2 may represent chat logs stored by one or more web servers, data source 3 may represent purchase data from a retailer, and so forth. Thus, to provide clear explanations, data pipelines 410 may be referred to based on the type of data that pipeline processes, such as an email pipeline, chat pipeline, order pipeline, and so forth. However, although logically distinct, the various pipelines 410 may be implemented by the same data pipeline system 310. To avoid obscuring the illustration, FIG. 4 only depicts the case where there is a one for one correlation between the data sources 320 and the data sinks 330. However, in practice there may be a one-to-many, many-to-one, or many-to-many correlation between the data sources 320 and the data sinks 330, with pipelines 410 merging the data as needed.

3.1 Data Sources

A data source 320 (e.g., 320B) is any source of data provided to the data pipeline system 310 for storing in one or more datasets. A dataset may be defined as a named collection of data. From the perspective of a data source 320 (e.g., 320C), data provided by the data source to the data pipeline system 310 can be structured, semi-structured, or unstructured data.

Structured data includes, but is not limited to, data that conforms to a well-known data model. Examples of structured data include, but are not limited to, data stored in a relational database and spreadsheet data.

Semi-structured data includes, but is not limited to, data that may not necessarily conform to a well-defined data model but nonetheless includes self-describing structure. Such self-describing structure may be in the form of tags, markup elements, or other syntactic elements that separate semantic elements from each other within the data and enforce hierarchical relationships between semantic elements. Non-limiting examples of semi-structured data include, but are not limited to, eXtensible Markup Language (XML) data and JavaScript Object Notation (JSON) data.

Unstructured data includes, but is not limited to, data that does not conform to a data model and does not contain self-describing structure. Examples of unstructured data include, but are not limited to, HyperText Markup Language (HTML) data (e.g., web pages), chat logs, and other text data.

A data source 320 (e.g., 320A) typically comprises one or more non-volatile data storage devices (e.g., one or more hard disks, solid state drives, or the like) on which the provided data is physically stored. Typically, the data is physically stored in one or more data containers such as, for example, in one or more file system files or in one or more other suitable data containers (e.g., a disk block). The one or more data storage devices (and hence the data source) may be embodied in a single computing device or distributed across multiple computing devices.

A data source 320 (e.g., 320A) typically also comprises a data access mechanism that a data requesting mechanism can use to obtain data from the data source. Typically, the data access mechanism of a data source comprises one or more executing software programs (e.g., application program 202A) for reading data from one or more data containers of one or more data storage devices of the data source in response to a request for the data from a data requesting mechanism and for providing the requested data to the data requesting mechanism in response to the request.

Typically, the data requesting mechanism also comprises one or more executing software programs (e.g., application program 202B). The data requesting mechanism may be a component of or a component separate from a data source 320 from which it requests data. Non-limiting examples of a data access mechanism include a database management system server, a network file server, a web server, or other server. Examples of a data requesting mechanism include, but are not limited to, a client application or other application for requesting data from a server.

The request for data from a data requesting mechanism to the data access mechanism of a data source 320 (e.g., 320N) may be made according to a well-known inter-process communication protocol such as, for example, a well-known networking protocol such as, for example, the HyperText Transfer Protocol (HTTP), the Structured Query Language (SQL) or other database query language networking protocol, a Remote Procedure Call (RPC) protocol (e.g., the Simple Object Access Protocol (SOAP)), a Network File System (NFS) protocol, and so forth. The network request may also be cryptographically secured according to a cryptographic protocol (e.g., Transport Layer Security/Secure Sockets Layer (TLS/SSL)).

In some instances, a data requesting mechanism may not use an inter-process communication mechanism such as a networking protocol to request data from a data access mechanism of a data source 320 (e.g., 320B). For example, if the data source 320 (e.g., 320B) is one or more file system files, then a data requesting mechanism may use an operating system application programming interface (API) to read data from the file(s). In this example, the operating system is considered to be the data access mechanism.

The distributed computing environment 300 may have tens, hundreds, or even thousands or more data sources 320. Each of the data sources 320 may provide different data, possibly even in different data formats. As just one simple example, one data source 320 (e.g., 320A) may be a relational database server that provides rows of data, another data source 320 (e.g., 320B) may be a log file that stores log entries as lines of character data, and another data source 320 (e.g., 320C) may be a web service that provides data in one or more Simple Object Access Protocol (SOAP) messages. Overall, the data pipeline system 310 may be provided with heterogeneous data from multiple heterogeneous data sources 320.

A data requesting mechanism that provides data obtained from a data source 320 (e.g., 320B) to the data pipeline system 310 is referred to herein as a "data provider". The environment 300 may comprise multiple data providers. For example, there could be a separate data provider for each data source 320 that is to provide data to the data pipeline system 310. As described in greater detail elsewhere in this document, a data provider can use a transaction service 318 to provide data to the data pipeline system 310.

3.2 Data Sinks

A data sink 330 (e.g., 330B) is any consumer of dataset data from the data pipeline system 310. For the perspective of a data sink 330 (e.g., 330C), the consumed data can be structured, semi-structured, or unstructured data.

A data sink 330 (e.g., 330A) typically comprises a data analysis mechanism for processing data obtained from the data pipeline system 310 in some particular way. Typically, the data analysis mechanism comprises one or more executing software programs (e.g., application program 202A) for analyzing, organizing, or otherwise processing data and presenting the results of data processing to a user. Examples of a data analysis mechanism include, but are not limited to, a graphical analysis software application or other software application for generating graphical charts, reports, or other graphical analysis of data in a graphical user interface. Another example of a data analysis mechanism is a text-based search engine that parses and indexes text data to provide a full-text searching service to users of the search engine.

The distributed computing environment 300 may have tens, hundreds, or even thousands or more data sinks 330. Each of the data sinks 330 may consume different data, possibly even in different data formats. Further, a data sink 330 (e.g., 330B) may consume data provided by one or more data sources 320. In other words, a data sink 330 may consume data obtained by the data pipeline system 310 from one data source 320 (e.g., 320A) or more than one data source 320 (e.g., 320A and 320B). Accordingly, a function of the data pipeline system 310 may be to combine data from multiple data sources 320 into a format that is consumable by a data sink 330. This is just one example of a possible function performed by the data pipeline system 310.

Overall, the environment 300 may comprise N data sources 320 and M data sinks 330 where N is equal to or different from M. Further, data the data pipeline system 310 obtains from a data source 320 (e.g., 320B) may be provided by the data pipeline system 310 to one or more data sinks 330 (e.g., one or more of 330A, 330B, 330C . . . 330N). Similarly, the data pipeline system 310 may combine data obtained from multiple data sources 320 (e.g., 320A and 320B) and provide the combined data to one or more data sinks 330 (e.g., one or more of 330A, 330B, 330C . . . 330N). As data moves through the data pipeline system 310 from the data sources 320 to the data sinks 330, a number of data transformation steps may be performed on the data to prepare the data obtained from the data sources 320 for consumption by the data sinks 330.

Environment 300 may include one or more data consuming mechanisms ("data consumers") for consuming (obtaining) dataset data from the data pipeline system 310 and providing the obtained data to one or more data sinks 330. Typically, a data consumer comprises one or more executing software programs (e.g., application program 202C). The data consumer may be a component of or a component separate from a data sink 330 to which it provides data. A data consumer may provide data obtained from the data pipeline system 310 in any manner that is suitable to a data sink 330 to which it is providing the data. For example, the data consumer may store the obtained data in a database or in a file system file or send the obtained data to a data sink 330 over a network (e.g., in one or more Internet Protocol (IP) packets). As described in greater detail elsewhere in this document, a data consumer can use the transaction service 318 of the data pipeline system 310 to consume (obtained) dataset data from the data pipeline system 310.

3.3 Data Pipeline System

A data pipeline system 310 comprises a storage plane 312 and a logic plane 316.

The storage plane 312 may be implemented with one or more non-volatile data storage devices, which may be distributed across one or more computing devices (e.g., device 100) on one or more data networks. The storage plane 312 comprises data lake 313, build database 314, and transaction database 315.

The data lake 313 is where datasets are stored. In an exemplary embodiment, the data lake 313 comprises a distributed file system implemented with commodity computing devices. For example, the data lake 313 may comprise the APACHE HADOOP DISTRIBUTED FILE SYSTEM (HDFS) or other distributed file system built on commodity computing hardware. The data lake 313 may also comprise archive storage for storing older dataset versions and/or to serve as a backup for a primary storage system of the data lake 313 (e.g., a distributed file system). In one exemplary embodiment, the AMAZON GLACIER archive storage service is used for archiving older versions of datasets.

The build database 314 and the transaction database 315 store metadata supporting functionality provided by the logic plane 316 of the data pipeline system 310 including metadata for supporting immutable and versioned datasets and for determining dataset build dependencies.

The build database 314 and the transaction database 315 may be implemented with one or more conventional database systems that store data in one or more tables. The build database 314 and the transaction database 315 may be managed by the same database system or different database systems. In an exemplary embodiment, the APACHE HBASE database system is used to implement the build database 314 and the transaction database 315. In another exemplary embodiment, the APACHE CASSANDRA database system is used to implement the build database 314 and the transaction database 315. Another possible database system that may be used to implement the build database 314 and the transaction database 315 is the POSTGRES (also known as POSTGRESQL) open source database system.

Logic plane 316 may be implemented as one or more software programs (e.g., one or more application programs 202) that are configured to execute on one or more computing devices (e.g., device 100). Logic plane 316 comprises to two services: a build service 317 and a transaction service 318.

The transaction service 318 provides support for atomically creating, and updating immutable and versioned datasets in the context of transactions. Data providers may use the transaction service 318 to create and update datasets in the data lake 313 with data obtained from data sources 320 in the context of transactions. Data consumers may use the transaction service 318 to read data from datasets in the data lake 313 in the context of transactions that is then provided to the data sinks 330. In some embodiments, the transaction service 318 ensures that the data that can be read from a dataset is only data that has already been committed to the dataset by a previously successful transaction.

The build service 317 leverages the transaction service 318 to provide immutable and/or versioned transformed datasets. A transformed dataset may be defined as a dataset that is generated (built) by applying a transformation program (or one or more sets of computer-executable instructions) to one or more other datasets. Thus, it can be said that a transformed dataset has a dependency on at least one other "base" dataset. A base dataset may accordingly be defined as a dataset on which at least one transformed dataset has a dependency.

According to some embodiments, a transformation program may be defined as a set of instructions associated with a dataset and which, when executed, uses the transaction service 318 to read data from the base dataset(s) in the context of a transaction, transforms and/or validates the data in some way, and uses the transaction service 318 to write the transformed and/or validated data to the transformed dataset in the context of a transaction. Each transaction that modifies a dataset is assigned a transaction identifier by the transaction service 318 that is unique to at least that dataset. The transaction service 318 records the transaction identifier in the transaction database 315. By doing so, each transaction that modifies a dataset is separately identifiable by its assigned transaction identifier. In addition, the transaction service 318 orders transactions on a dataset by the time that they are committed with corresponding transaction commit identifiers.

In order to increase automation of the pipeline, the build service 317 may maintain build dependency data that represents one or more directed acyclic graphs of dataset build dependencies. From the build dependency data, the build service 317 can determine for a given derived dataset the order in which to build other transformed datasets before the given transformed dataset can be built.

When a new version of a transformed dataset is built, the build service 317 may create a build catalog entry (e.g., a row or record) in the build database 314. The build catalog entry identifies the version(s) of the base dataset(s) from which the new version of the transformed dataset was built. By doing so, it can be determined for any given version of a transformed dataset, including historical versions, the version(s) of the base dataset(s) from which the version of the transformed dataset was built. Further, because datasets, including transformed datasets, are immutable, data of a historical version of a transformed dataset can be traced to the data from which it was derived, even if that data is also historical.

The build service 317 may also version transformation programs for tracing and tracking purposes. In this case, the build catalog entry may also contain the version of the transformation program that was executed by the build service 317 to build the new version of the derived dataset.

The build service 317 and the transaction service 318 may each provide an interface by which users and/or other software programs can invoke the services thereof by issuing one or more commands thereto and/or requests thereof. For example, the interface may be a graphical user interface, a command line interface, a networking interface, or an application programming interface (API).

In some embodiments, the build service 317 and/or transaction service 318 include logic that perform one or more validation checks on the transformed data. If a fault is detected by either service, that service stores metadata in association with the affected dataset that includes information such as, the time the fault occurred, the dataset(s) involved in the fault, data specifically related to the fault (e.g. transaction commit error, missing data during transformation, transformation failure, presence of NULL values where none should be, etc.), and so forth. Thus, when the fault detection system 340 accesses the data pipeline system 310 to perform fault detection tests, the datasets and metadata related to the fault can be accessed and analyzed. However, in other embodiments, the build service 317 and/or transaction service 318 instead of or in addition to actively performing validation checks, leave behind persistent artifacts representing various metrics related to the transformation and/or transactions, such as the before transformation size of the dataset, after transformation size of the dataset, number of columns/rows if the data represents tabular data, presence of NULL values, and so forth which the fault detection system 340 can later access and analyze.

Furthermore, the build service 317 and/or transaction service 318, in some embodiments, leaves behind persistent artifacts, such as datasets, relating to various intermediate states of the data as the data passes through the data pipeline system 310. For example, the data pipeline system 310 may perform multiple transformations or multi-step transformations to the data and maintain data, a portion of the data, or metrics relating to the various intermediate states along the transformation process for later review by the fault detection system 340. Thus, the fault detection system 340 is not limited to performing fault detection tests only on pre-transformation and post-transformation data, but may define tests that are to be performed on data in intermediate states of transformation.

3.4 Fault Detection System

The fault detection system 340 is responsible for communicating with the data pipeline system 310, data sources 320, and/or data sinks 330 to determine whether one or more faults occurred with the pipelines 410. In some embodiments, the fault detection system 340 then provides one or more interfaces (for example, one or more web interfaces) displaying the faults and/or potential faults with the pipelines 410 for review by an engineer, administrator, or other end user via the client application 350. In addition, in some embodiments the fault detection system 340 is responsible for managing the plugins that can be uploaded by users of the client application 350 and used to define the tests that the fault detection system 340 performs on the pipelines 410.

Figure 5:
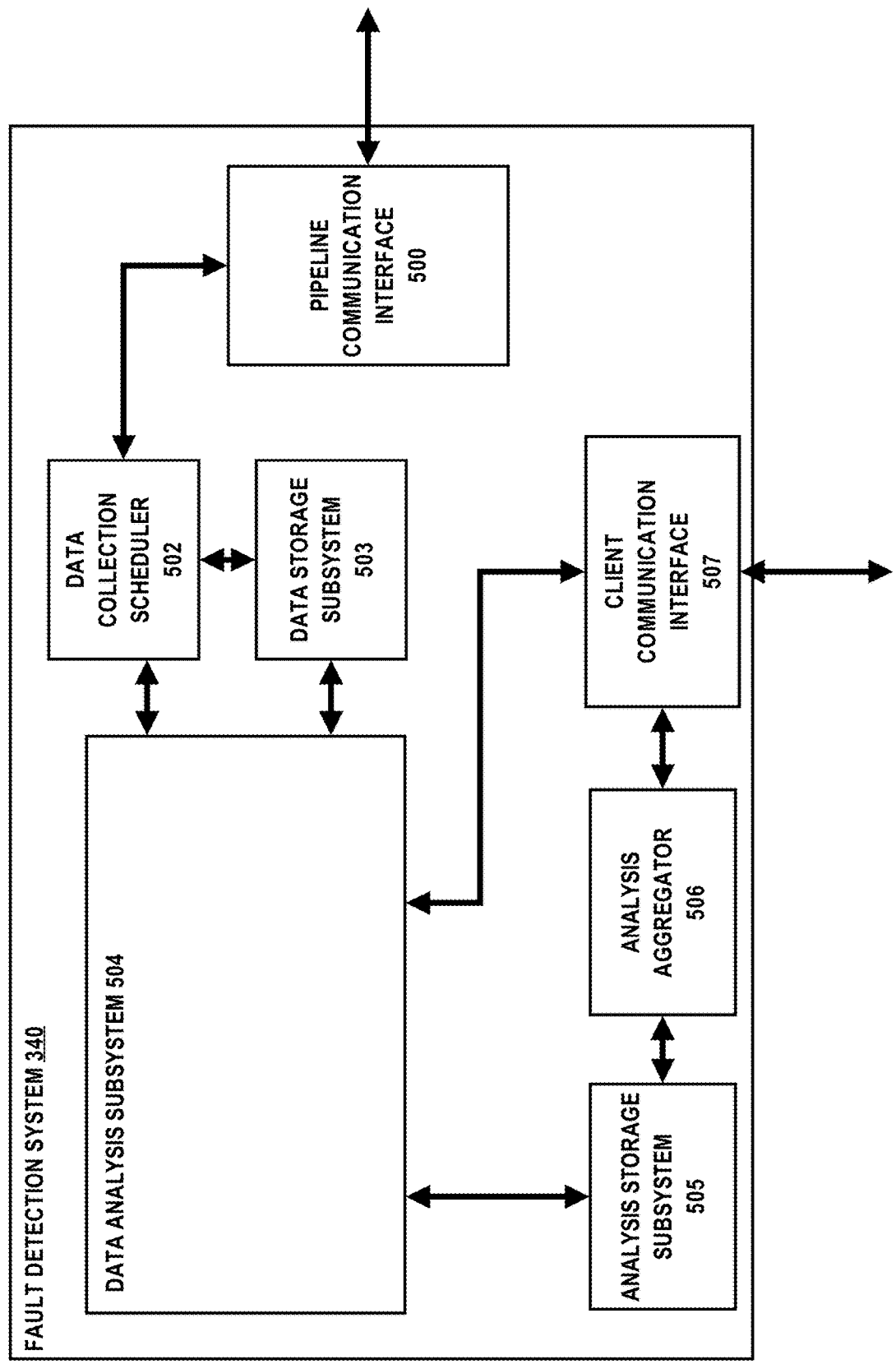
FIG. 5 is a block diagram of an example fault detection system according to an embodiment.

FIG. 5 is a block diagram representing a logical view of a data pipeline system according to an embodiment. In FIG. 5 the fault detection system 340 includes a pipeline communication interface 500 for communicating with the data pipeline system 310, data sources 320, and/or data sinks 330, a data collection scheduler 502 that keeps track of how often tests defined by the plugins should be executed and collects data for said tests which is stored in data storage subsystem 503, a data analysis subsystem 504 that performs tests on the data stored in the data storage subsystem 503 and stores the results in analysis storage subsystem 505, a client communication interface 508 for communicating with the client application 350, and an analysis aggregator 506 that aggregates and organizes the result data stored in the analysis storage subsystem 505 that is utilized by the client communication interface 507 to generate one or more interfaces for the client application 350.

3.4.1 Pipeline Communication Interface

The pipeline communication interface 500 provides an interface for communicating with the data sources 320, data pipeline system 310, and/or data sinks 330. In some embodiments, the data sources 320, data pipeline system 310, and/or data sinks 330 provide one or more interfaces (such as APIs, inter-process communication mechanisms, network protocols, etc.), that allows the pipeline communication interface 500 to send requests for data and receive the data in return.

Whether the pipeline communication interface 500 is configured to collect data from all the aforementioned sources or just a subset of the sources may be dependent on the extent of information stored by the data pipeline system 310. In cases where the data pipeline system 310 stores all the before/after transformation datasets and sufficient metrics related to the transformations and/or transactions in the pipeline 410, obtaining supplemental data from the data sources 320 and/or data sinks 330 may not be required. However, in other cases, the data pipeline system 310 may need to supplement data from the data pipeline system 310 with data from the data sources 320 and/or data sinks 330.

For example, pipeline 1 may be configured to perform a transformation on a dataset collected from data source 1 and provide the transformed data to data sink 1. However, the data pipeline system 310 might not be configured to persistently store certain types of metadata related to the transformation, such as the number of columns that should be in the data set before and after transformation. If the data analysis subsystem 504 requires such information to perform a test to ensure the before and after datasets correctly correspond to a given schema, the pipeline communication interface 500 may pull all or a sample of the original dataset from data source 1 and the transformed dataset from data sink 1 for eventual use by data analysis subsystem 504 when performing the test. Thus, the pipeline communication interface 500, depending on the embodiment, could be configured to send and receive communications based on the protocols and/or interfaces exposed by each of the data sources 320, data pipeline system 310, and/or data sinks 330. In other embodiments, the fault detection system 340 may include multiple pipeline communication interfaces that are each configured to handle communications using a particular protocol and/or interface.

In an embodiment, the pipeline communication interface 500 is utilized by the data collection scheduler 502 to pull data from the data sources 320, data pipeline system 310, and/or data sinks 330.

3.4.2 Data Collection Scheduler

The data collection scheduler 502 maintains a schedule of when tests defined by plugins within the data analysis subsystem are to be executed and retrieves the information needed for the test from the data sources 320, data pipeline system 310, and/or data sinks 330 via the pipeline communication interface 500.

The plugin architecture of the data analysis subsystem 504 will be explained in more detail later in the description. However, in some embodiments, each plugin installed into the data analysis subsystem 504 is stored with metadata defining what data and/or metadata the plugin requires to perform its associated fault tests, from which datasets, sources, sinks, and/or pipelines that information should be obtained, how often the test will be performed, time periods for which the data should be collected, and so forth. For example, a plugin may specify to retrieve all records in the dataset with the identifier "DataSet 1" from data lake 313 which is part of pipeline 1 and has been collected in the past day. Once the plugin installed, the data analysis subsystem 504 registers the plugin with the data collection scheduler 502 and provides the aforementioned information. When the data collection scheduler 502 determines that the test should be executed, for example by comparing a timestamp of the last time the test was executed to a current time as indicated by an internal system clock, the data collection scheduler 502 uses the aforementioned information to generate requests through the pipeline communication interface 500 for the required data and/or metadata.

When the requested data and/or metadata are received by the data collection scheduler 502, the data collection scheduler 502 stores the data and/or metadata in data storage subsystem 503. In some embodiments, the data collection scheduler 502 adds identifying information for the requested data and/or metadata that specifies the source of the data, a timestamp indicating when the data was collected, and so forth. The data collection scheduler 502 then signals the data analysis subsystem 504 that the data for the tests has been stored and is ready for processing and analysis.

In other embodiments, instead of collecting data for the plugins based on the schedule for executing the test, the data collection scheduler 502 may perform bulk data transfers on a set schedule for all registered plugins. Furthermore, in some embodiments, the data collection scheduler 502 maintains an index that indicates what information has already been collected and if the information needed to perform the tests of a plugin have already been stored in the data storage subsystem 503 for another plugin, the data collection scheduler 502 signals the data analysis subsystem 504 that the data is ready for processing and analysis without submitting a redundant request for the information. In some embodiments, the data collection scheduler 502 begins the process of collecting the information for a plugin ahead of the scheduled tests for the plugin. For example, the data may be collected a set amount of time ahead of the test or based on a historic analysis of how long it takes on average to collect data for that particular plugin.

The previous embodiments described in this section belong to the "pull" model of data collection. Meaning that the information is requested from the source as opposed to being sent by the source on its own volition (which is referred to as the "push" model). In some embodiments, instead of or in addition to the "pull" model, the fault detection system 340 is configured to utilize the "push" mode. For example, the data collection scheduler 502 may be installed on the data pipeline system 310 instead of the fault detection system 340 and pushes data to the data storage subsystem 503 through the pipeline communication interface 500 when the time has come to perform a test. As another example, the pipeline communication interface 500 may execute at least some baseline validity tests which, when registering a failure or potential failure (warning), cause the data pipeline system 310 to push the data related to that issue to the data storage subsystem 503 and/or signal the data analysis subsystem 504 to perform a test associated with that fault or potential fault.

3.4.3 Data Storage Subsystem

In an embodiment, the data storage subsystem 503 represents one or more storage devices and/or logical storage locations used to hold data collected by the data collection scheduler 502. The data storage subsystem 503 and the data contained therein are then made available for use by the data analysis subsystem 504 to determine whether faults occurred with the pipelines 410. In some embodiments, the data storage subsystem 503 indexes the data collected by the data collection scheduler 502, such as by date of collection, date range to which the data pertains, type of metric and/or data collected, the data source from which the data was collected, the dataset the data belonged to, the pipeline to which the data belonged, the plugin requiring the information, and so forth. The data analysis subsystem 504 is then able to retrieve the data by performing a search, using the index, for the data required to perform a particular fault detection test.

In some embodiments, the data storage subsystem 503 comprises one or more non-volatile data storage devices (e.g., one or more hard disks, solid state drives, or the like) on which the provided data is physically stored. Furthermore, the data may be physically stored in one or more data containers such as, for example, in one or more file system files or in one or more other suitable data containers (e.g., a disk block). The one or more data storage devices (and hence the data source) may be embodied in a single computing device or distributed across multiple computing devices. In some embodiments, the data storage subsystem 503 is implemented using a database, such as relational, object-relational, or object database.

3.4.4 Data Analysis Subsystem

The data analysis subsystem 504 comprises logic that defines one or more tests to be performed against the pipelines 410 of the data pipeline system 310. The logic is defined by one or more plugins which represent modular packages of instructions that can be uploaded by users and configured via the client application 350.

Figure 6:
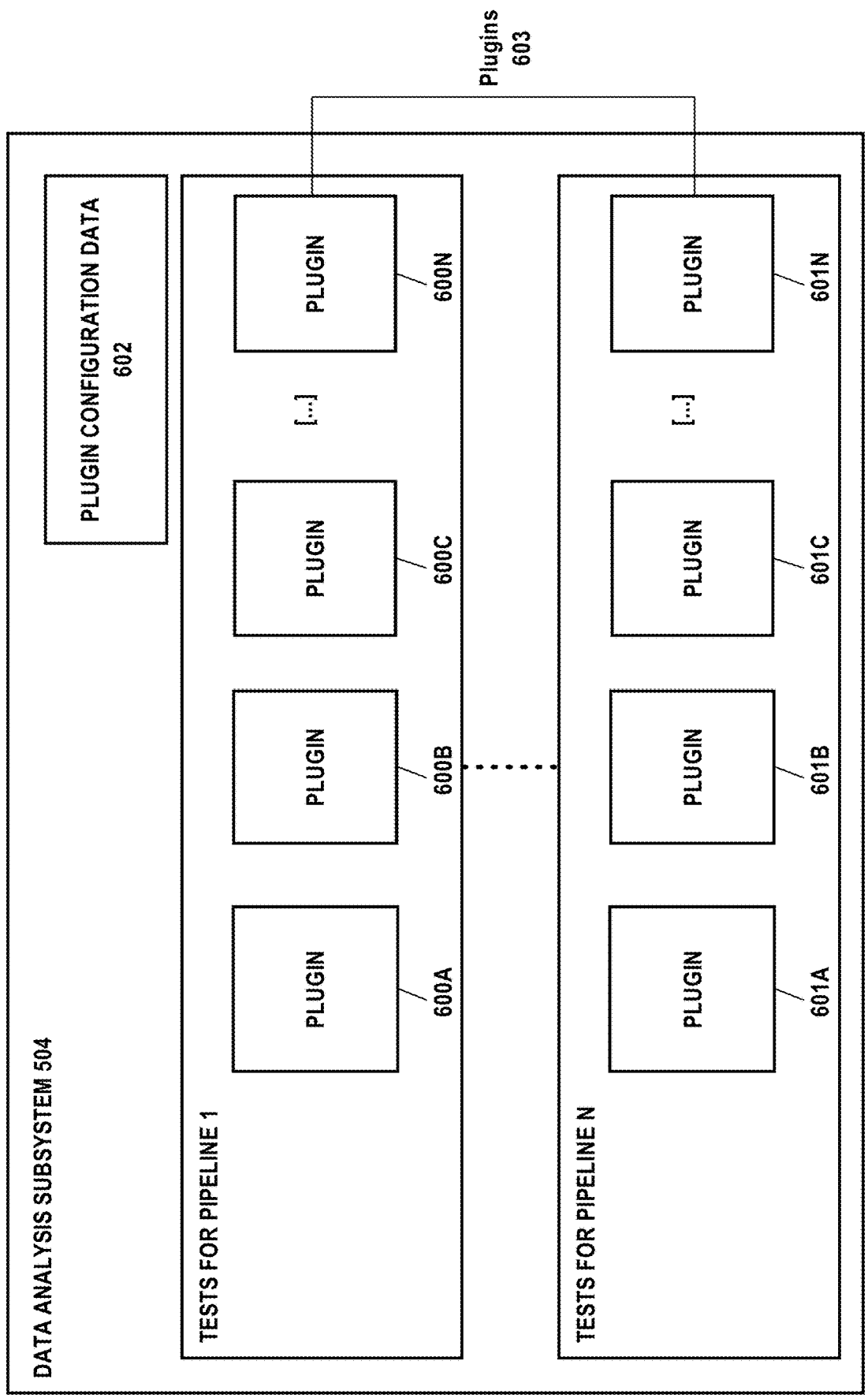
FIG. 6 is a block diagram representing a logical view of a data analysis subsystem according to an embodiment.

FIG. 6 is a block diagram representing a logical view of a data analysis subsystem according to an embodiment. In FIG. 6, the data analysis subsystem 504 logically comprises tests for the various pipelines 410, the tests for each pipeline being defined by one or more plugins 603. In addition, data analysis subsystem 504 includes plugin configuration data 602 that comprises, for each plugin, the customized configuration points for the plugin and/or metadata related to the plugin. For example, the configuration points and/or metadata may comprise information such as how often the test for the plugin should be executed, what data the plugin needs to perform the test, what sources the data or subsets of the data should be obtained from, threshold values for the test, parameters or arguments used within the tests, pipeline(s) that the plugin will monitor, and so forth. In some embodiments, each of the plugins 603 is assigned to monitor only one of the pipelines 410. Thus, the same plugin may be uploaded or reused more than once, with the plugin configuration data 602 for the plugin being different for each upload. For example, each plugin, although containing the same base logic, may differ as to the name of the plugin and/or the various settings and thresholds defined by the plugin configuration data 602. However, in other embodiments, the same instantiation of the plugin with the same plugin configuration data 602 can be used to monitor multiple pipelines.

In FIG. 6, the plugin configuration data 602 is shown as distinct from the plugins 603 themselves; however this represents a logical view of the data. In other embodiments, from a storage perspective, subsets of the plugin configuration data 602 may be stored with the plugin to which those subsets pertain.

In an embodiment, the plugins 603 are provided to the data analysis subsystem 504 by the client communication interface 507 via interactions with client application 350. In some embodiments, upon receiving a plugin from the client communication interface 507, the data analysis subsystem 504 inspects metadata from the plugin defining one or more configuration points, representing data that needs to be provided for the particular environment that the plugin will be monitoring. The data analysis subsystem 504 then communicates the needed configuration points to the client communication interface 507, which generates instructions that when provided to the client application 350, causes the client application 350 to display an interface through which a user can set the configuration points. In some embodiments, the client communication interface 507 is configured to also generate an interface through which the settings for the configuration reports can be edited after being initially set.

Once the information for the configuration points is provided, the data analysis subsystem 504 registers the plugin with the data collection scheduler 502, such by providing information indicating the needed data, from which sources/datasets/pipelines/data sinks the data should be collected, and an interval indicating how often the test(s) defined by the plugin will be executed. Then, based on the interval provided, the data collection scheduler 502 retrieves the specified information and stores that information in the data storage subsystem 503 for consumption by the plugin.

When the information has been stored for processing, the data collection scheduler 502 signals the data analysis subsystem 504, which then executes the test(s) defined by the plugin. The result of executing the test(s) defined by the plugin is then stored in the analysis storage subsystem 505 for use by the analysis aggregator 506 and/or client communication interface 507 to generate one or more interfaces through which a user of the client application 350 can view reports of health status, such as faults and/or potential faults, relating to the pipelines 410.

3.4.5 Plugins

The plugins 603 represent modular packages of instructions and/or metadata that define tests to be performed on one or more of the pipelines 410. In an embodiment, the plugins 603 include base logic that generally defines the test, as well as "configuration points" that allow certain aspects of the test to be customized for the environment (e.g. pipeline) that the plugin will be testing for faults.

Figure 7:
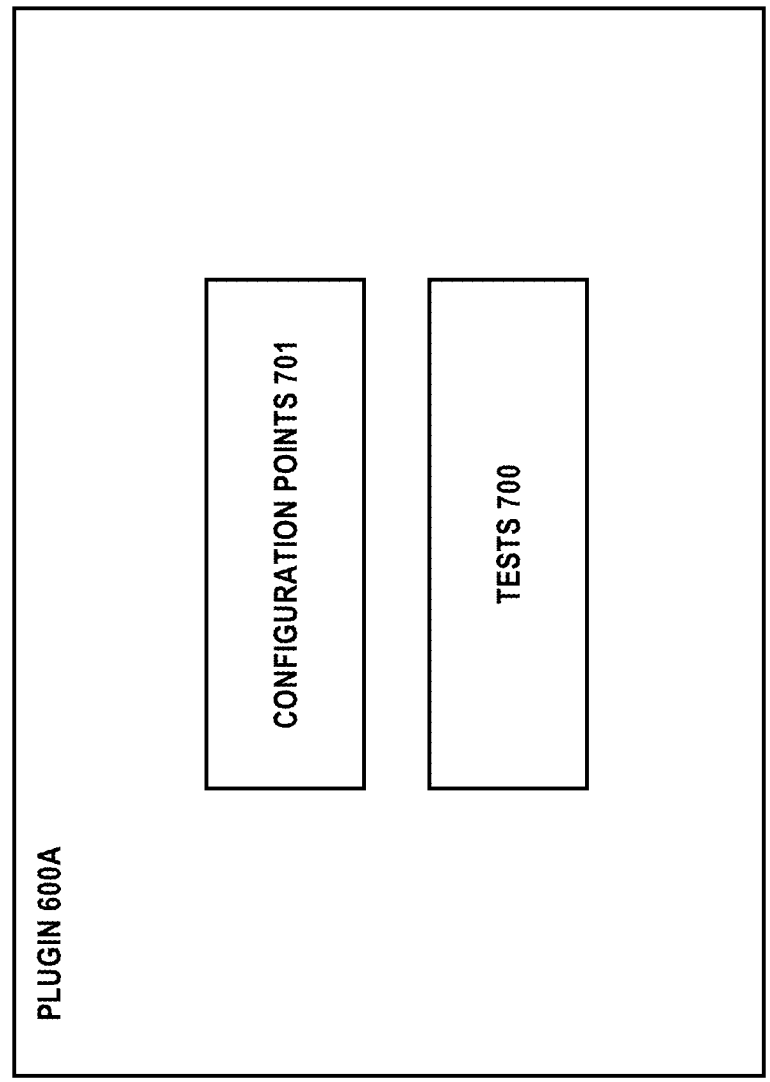
FIG. 7 is a block diagram representing a logical view of a plugin according to an embodiment.

FIG. 7 is a block diagram representing a logical view of a plugin according to an embodiment. Although FIG. 7 uses plugin 600A to demonstrate the following examples, the features described with respect to plugin 600A are equally applicable to any of the plugins 603. In FIG. 7, plugin 600A comprises one or more tests 700 and one or more configuration points 701.

In an embodiment, the tests 700 represent base logic for performing the tests on data from the pipelines 410. The tests 700 may be represented as code, functions, methods, instructions or any other mechanism used to define executable logic. For example, the tests 700 may be written in languages such as C++, Java, Python, Ruby, and so forth. The exact tests 700 performed by the plugin 600A are not critical and the architecture is adaptable enough to allow for plugins 603 which define virtually any kind of test. Examples of tests that the plugins 603 can define are provided below in Section 4.0 "Example Plugin Tests". In some embodiments, each of the plugins 603 defines only one test. However, in other embodiments, each of the plugins 603 may define multiple tests or a test comprising multiple subtests.

In an embodiment, the configuration points 701 represent elements within the tests 700, such as variables and/or functions that are earmarked as being supplied via the client application 350. For example, the configuration points 701 may represent variables that define which pipeline(s) the plugin 600A will monitor, which data sets from the pipeline(s) will be collected to perform the tests 700, how often the tests 700 will be performed, threshold values utilized by the tests 700, and so forth. Furthermore, as additional examples, the configuration points 701 may also identify functions to be implemented by a user via the client application 350, such as a function for computing a value, making a determination, and so forth. For instance, plugin 600A may require a function to be implemented that defines a threshold value for use within the tests 700 based on factors which are unique or customizable to the monitored environment. The configuration points 701 can be identified using any number of mechanisms, such as by annotating the variables/functions with a keyword (such as "CONFIG_variablename"), using a data structure that identifies the variables/functions which are configuration points (such as a table), and so forth.

In an embodiment, when the plugin 600A is loaded into the data analysis subsystem 504, the data analysis subsystem 504 uses the configuration points 701 to identify the information that needs to be supplied in order to correctly execute the tests 700. The data analysis subsystem 504 then communicates the identified configuration points 701 to the client communication interface 507, which generates an interface (such as a web interface) that displays the configuration points 701 and is configured to allow a user to supply the configuration points 701 via the client application 350.

The above embodiment is a case where the client communication interface 507 contains the logic for generating an interface for collecting data for the configuration points 701 based on the definitions provided by the plugin 600A. However, in some embodiments, the plugin 600A itself comprises logic to generate an interface through which the information for the configuration points 701 can be collected. For example, the developer of each plugin may include logic for generating an HTML page with widgets for collecting the plugin configuration data 602 that can be customized with text, graphics, links, etc. unique to the particular plugin 60A. In such embodiments, the plugin 600A upon being uploaded to the data analysis subsystem 504 executes the aforementioned logic and provides the HTML pages to the client communication interface 507 for transfer to the client application 350.

The results produced by executing the tests 700 may vary from embodiment to embodiment. For example, in some embodiments, the tests 700 may produce a status indicator (e.g. fault, potential fault, OK, and so forth) indicating whether the monitored pipeline failed the tests 700, generated a warning, was inconclusive, or passed the tests 700. If the tests 700 comprise multiple subtests, the plugin 600A may produce a status for each subtest. However, in other embodiments, the tests 700 also generate additional metadata associated with the environment and/or performed tests 700. For example, the plugin 600A may define a test which monitors the volume of data produced each day by the pipeline and generates a fault if the volume is at or below a first threshold, a warning if the volume is between the first threshold and a second threshold, and an OK status if the volume is at or above the second threshold. In addition to storing the status of the test performed, the plugin 600A may also be configured to store the date that test was performed, which data sets/pipelines were monitored, a metric representing the volume of data that the status was based on, and so forth.

3.4.6 Analysis Storage Subsystem

In an embodiment, the analysis storage subsystem 505 represents one or more storage devices and/or logical storage locations used to hold result data produced by the data analysis subsystem 504. The analysis storage subsystem 505 and the result data contained therein are then made available for use by the analysis aggregator 506 and/or client communication interface 507 to generate one or more interfaces through which a user of the client application 350 can view reports of representing the health of the pipelines 410.

In some embodiments, the analysis storage subsystem 503 indexes the result data, such as by date of collection, date range to which the analysis pertains, type of metric and/or data analyzed, the data source from which the data used for the analysis was collected, the dataset the data used for the analysis belonged to, the pipeline to which the data used for the analysis belonged, status of the associated test, and so forth. The analysis aggregator 506 and/or client communication interface 507 are then able to retrieve the results by performing a search, using the index, for the result data required to generate status reports in one or more interfaces provided to the client application 350.

In some embodiments, the analysis storage subsystem 505 comprises one or more non-volatile data storage devices (e.g., one or more hard disks, solid state drives, or the like)

on which the provided data is physically stored. Furthermore, the data may be physically stored in one or more data containers such as, for example, in one or more file system files or in one or more other suitable data containers (e.g., a disk block). The one or more data storage devices (and hence the data source) may be embodied in a single computing device or distributed across multiple computing devices. In some embodiments, the analysis storage subsystem 505 is implemented using a database, such as relational, object-relational, or object database.

Although storage subsystems, such as analysis storage subsystem 505 and data storage subsystem 503, are depicted as separate components in FIG. 5, this is a logical representation. In some embodiments, both may be implemented using the same storage mechanism. For example, both may represent different tables or different columns within the same table of the same relational database.

3.4.7 Analysis Aggregator

The analysis aggregator 506 is a component of the fault detection system 340 responsible for aggregating the results stored in the analysis storage subsystem 505 for display in an efficient manner. The aggregations produced by the analysis aggregator 506 are used by the client communication interface 507 to generate interfaces for the client application 350 that displays the health of the pipelines 410 and/or accompanying details of the fault detection tests performed on the pipelines 410.

In an embodiment, the analysis aggregator 506 is configured to inspect the result information stored in the analysis storage subsystem 505 and produce additional metrics and/or hierarchies of information for the pipelines 410. In regard to additional metrics, the analysis aggregator 506 may generate statistics, such as indicating a percent tests that have produced each type of status (fault, potential fault, OK, etc.) for all pipelines, each pipeline, subsets of pipelines, and so forth for use by the client communication interface 507 when generating interfaces/reports to display the health of the data pipeline system 310. In addition to controlling granularity of the metrics by pipelines, other indices can be used as well, such as by date ranges, datasets, type of test, by plugin, by subsets of tests defined by a plugin, and so forth. There is virtually no limit to the indices that can be aggregated over by the analysis aggregator 506.

In some embodiments, the analysis aggregator 506 inspects the result data stored in the analysis storage subsystem 505 and generates one or more trees/graphs representing hierarchies of result information. For instance, the first tier of nodes may be indexed by pipeline and date range, which have edges that connect to a second tier of nodes representing the tests performed by the individual plugins 603 for that pipeline/data range. The second tier of nodes then have additional edges connecting to a third tier of nodes representing individual tests/subtests. At each tier, the node may include information that has been aggregated over the nodes below in the hierarchy, such as status indicator and other metrics. The information included at each node may differ. For example, at the first tier, the nodes may store only a status identifier. However, when delved down to the third tier, each node may store metrics related to the exact test/subtest the node represents.

In some embodiments, the analysis aggregator 506 aggregates status for each node based on the worst case status of the nodes below in the hierarchy. For example, if a first node represents the aggregation of three tests performed on pipeline 400A on Jul. 21, 2015, where the status of the first test was "OK", the status of the second test was "OK", and the status of the third test was "fault", the status for the first node would be "fault". Similarly, if the first test returned "potential fault", and the second and third tests returned "OK", the status of the first node would be set to "potential fault".

In some embodiments, the analysis aggregator 506 performs aggregations ahead of time and stores the results back into the analysis storage subsystem 505 for efficient delivery to the client communication interface 507 when that aggregation is requested. For example, the client communication interface 507 may only be configured to generate interfaces using one or more predefined hierarchies and/or with one or more predefined sets of information related to the fault detection tests performed on the pipelines 410. As a result, the analysis aggregator 506 may be configured to generate a data structure or data structures for those particular hierarchies and/or sets of information. However, in other embodiments, the analysis aggregator 506 performs aggregations in response to receiving instructions from the client communication interface 507 for specific types of aggregations to be provided.

3.4.8 Client Communication Interface

The client communication interface 507 represents a component that manages communication between the fault detection system 340 and the client application 350. The exact protocol and/or mechanisms used to implement the communication between the client communication interface 507 and the client application 350 is not critical. However, examples will be provided in the remainder of this section.

In some embodiments, the client communication interface 507 is configured as a web server and the client application 350 is configured as a browser or browser-enabled application. Thus, in such embodiments, the client communication interface 507 receives a request for web pages from the client application 350 and in response, generates the requested web pages (or retrieves them from storage if pre-generated) and communicates those web pages to the client application 350. As is typical with web servers, the requests and the web pages correlating to those requests can be communicated using Hypertext Transfer Protocol (HTTP). Furthermore, the web pages generated by the client communication interface 507 may comprise one or more instructions, such as Hypertext Markup Language (HTML) instructions, Cascading Style Sheet (CSS) instructions, JavaScript instructions, and so forth, which when executed generate the display and/or reference other resources (videos, images, documents, instructions, etc.) that need to be retrieved by the client application 350 to fully render the web page.

In some embodiments, the client communication interface 507 is configured to display many different interfaces, each of which relates to a particular function or functions. For example, the interfaces produced by the client communication interface 507 may include a home page for logging into the fault detection system 340 using a credential mechanism (e.g. username/password, biometrics, certificates, and so forth), a general status page for monitoring all pipelines 410 and/or time periods, a more detailed status page that results from drilling into the pipelines 410 and/or time periods specified by the general status interface, a plugin upload and/or configuration interface, and so forth. Examples of interfaces that may be provided by the client communication interface 507 are described below in Sections 6.0-6.4.

In some embodiments, in order to display the status and/or metric information for the tests 700, the client communication interface 507 utilizes data structures produced by the analysis aggregator 506. In an embodiment, the client communication interface 507 uses pre-generated data structures produced by the analysis aggregator 506. Alternatively, when a particular type of aggregation is needed, the client communication interface 507 may provide instructions to the analysis aggregator 506 indicating the number of tiers, the indices to be aggregated over for each tier, the information that should be added to each node, and so forth. In response, the analysis aggregator 506 produces a data structure representing the requested aggregation. The client communication interface 507 then traverses the data structure to create data elements and/or graphical elements, such as widgets, for reports sent to the client application 350 in one or more web pages.

For example, assume the client communication interface 507 is configured to generate a status report where the top level aggregation is represented as a matrix where the first index is pipeline and the second index is a time period. The next level of aggregation displays the status of tests 700 performed for each plugin that executed tests 700 for the specified pipeline during the specified time period. The final level of aggregation displays the status of each test and/or subtest performed by the plugin. The client communication interface 507 may communicate to the analysis aggregator 506 instructions to produce a graph representing the aforementioned relationships. The analysis aggregator 506 then searches through the analysis storage subsystem 505 for the relevant information, performs aggregations as needed, generates the graph, and returns the graph to the client communication interface 507. Upon receiving the graph, the client communication interface 507 traverses the graph and generates instructions or combinations of instructions which, when executed by the client application 350, cause the client application 350 to present the display described at the start of this example. For example, for the top level, the client communication interface 507 may construct the matrix so that each element is a selectable widget that causes an updated or new web page to be generated which displays the next level of aggregation for the selected pipeline/time period. Next, the individual plugins displayed at that level of aggregation can be generated with widgets for delving deeper to display the status information and/or metrics associated with the particular tests/subtests of the selected plugin.

Although the above examples focus primarily on the case where the client communication interface 507 is a web server and the client application 350 is a browser or browser-enabled application, this configuration is not required. For example, in other embodiments, a user of the client application 350 may submit commands and receive health status information for the pipelines 410 via a command line interface or a custom built application that uses a well-known or propriety communication protocol.

3.5 Client Application

The client application 350 represents a communication point from which a user can interact with the fault detection system 340 to monitor status reports regarding the pipelines 410, upload/configure plugins for the fault detection system 340, and so forth. In some embodiments, the client application 350 represents a software application executing on a client computer, which is not explicitly depicted in FIG. 3. For brevity, the client application 350 may be described as executing instructions from the client communication interface 507, displaying interfaces, collecting information, and so forth. However, this is shorthand for the underlying client computer performing the tasks in response to executing instructions which represent the client application 350. The client computer, in some embodiments, can be implemented using the hardware and software systems illustrated in FIG. 1 and FIG. 2.

In an embodiment, the client application 350 represents a browser (such as Firefox, Chrome, Internet Explorer, etc.) that communicates with the client communication interface 507 of the fault detection system 340 via the HTTP protocol. Thus, the client application 350 submits an HTTP request for a webpage, such as a home or portal page, and the client communication interface 507 sends the webpage back in an HTTP response. The home or portal page may contain links and/or widgets that cause the client application 350 to update the display of the web page or request a new web page from the client communication interface 507. For example, the home page may contain one or more buttons which each cause the client application 350 to send a new HTTP request for a specific web page (general status page, detailed status page, plugin upload/configuration page, etc.), which causes the client communication interface 507 to return said webpage in a new HTTP response. However, in other embodiments, the client application 350 may utilize a different type of interface, rather than a web interface, such as a command line interface.

4.0 Example Plugin Tests

The tests 700 implemented by each of the plugins 603 can represent virtually any kind of fault detection test without limitation. However, this section provides non-limiting examples of tests 700 that the plugins 603 may implement.

4.1 Schema Validation Tests

A schema is a structure that acts as a blueprint indicating, at a minimum, the form that the data should take. For example, relational database schemas typically define tables of data, where each table is defined to include a number of columns (or fields), each tied to a specific type of data, such as strings, integers, doubles, floats, bytes, and so forth. Schema validation is the process of inspecting data to ensure that the data actually adheres to the format defined by the schema. Schemas in relational database may also define other constructs as well, such as relationships, views, indexes, packages, procedures, functions, queues, triggers, types, sequences, and so forth. However, schemas other than relational database schemas also exist, such as XML schemas. In some embodiments, the schema(s) indicating the format of the data stored by the data sources 320 and the schema representing the data format expected by the data sinks 330 are used to implement the transformations performed by the pipelines 410. For instance, the logic defined by each pipeline may represent the steps or algorithm required to transform data from the data source format into the data sink format. If the transformation is performed properly, the data after transformation should be able to pass validation with respect to the schema of the data sink. However, if errors occur during the transformation, the validation might fail if the transformed data is improperly formatted.

In an embodiment, the tests 700 implemented by a plugin perform schema validation on the transformed and/or pre-transformed data within a pipeline. Depending on the embodiment, the plugin may specify for the data collection scheduler 502 to collect all or a sample of the transformed and/or pre-transformed data from one or more points within the pipeline, such as from the data sources 320, data lake 313 of the data pipeline system 310, and/or data sinks 330. In some cases, the plugin may inspect only the transformed data and compare that transformed data to the format defined by the schema.

For example, assuming the transformed data is tabular the plugin may check whether the transformed data contains the correct number of columns, the data in each column adheres to the type specified by the schema, certain columns do not contain NULL values, and so forth. The result of executing the tests 700 may include the status indicator of the test (OK, fault, potential fault, etc.), and if the status is not "OK", an indication of which parts of the schema were violated by the transformed data. However, in some embodiments, the plugin may also inspect the pre-transformed data to ensure that the pre-transformed data adheres to the schema of the data sources 320. For example, the data from the data sources 320 may be malformed with respect to their purported schemas. As another example, the data sources 320 may periodically change schemas, resulting in a need to generate an alert informing an engineer to update the transformation logic built into the data pipeline system 310.

Configuration points for schema validation tests may include the schema that should be compared against the pre-transformation and/or post-transformation data, the pipeline and/or data sets from which to collect the data, how often the tests 700 should be performed, criteria for determining whether a violation is a "fault" or "potential fault" (or "warning"), valid values for certain columns/fields (e.g. ensuring columns which are defined as non-NULL do not contain NULL values, that non-negative columns do not contain numbers which are negative, etc.) and so forth.

4.2 Volume Tests

In an embodiment, the tests 700 implemented by a plugin perform volume checks on the pre-transformed and/or post-transformed data within a pipeline. One indicator that a fault may have occurred within a pipeline of the data pipeline system 310 is that the volume of data that passes through the pipeline is far less than expected. For example, this may indicate that data is not being fetched properly from the data source 320, that the transformation steps are losing data, that the data is not being collected properly by the data sinks 330, and so forth. Thus, the tests 700 defined by a plugin may specify to collect the data or metrics of the data from the data sources 320, data pipeline system 310, and/or data sinks 330. The volumes of the data collected at one or more stages of the monitored pipeline can then be compared to threshold values to determine whether the volume has dropped to a critical level. In some embodiments, multiple thresholds can be used to correspond to different status indicators. For example, if the volume drops below a first threshold, the plugin may indicate a "potential fault" or "warning", but if the volume drops below a lower second threshold, the plugin may indicate a "fault".

Configuration points for volume checks may include the thresholds (optionally for each stage or overall) that trigger different status indicators, the pipeline and/or data sets to monitor, the schedule for performing the volume check, the date ranges over which to calculate the volume, and so forth. In some embodiments, the thresholds are set through the plugin configuration interface 1100. In some embodiments, the thresholds may be set differently for different periods of time based on the overall knowledge of the pipeline. For example, volume over the weekends may be known to be significantly lower than during the weekdays, and the plugin may allow the thresholds to be set differently for different days and/or times of the year. However, in other embodiments, as described below in more detail in Section 4.1, the thresholds may be automatically determined by using a classifier trained on historic volume data.

4.3 Log File and/or Alert Checks

In some embodiments, the data pipeline system 310 includes one or more components that perform their own validating tests on the data moving through the pipelines 410. If a validation test performed by the data pipeline system 310 fails, the fault and associated data/metadata related to the fault are stored in one or more log files. Additionally or alternatively, the data pipeline system 310 may send a message to the fault detection system 340 via the pipeline communication interface 500 that identifies the fault and includes any related data. For example, the message may include identification of the type of fault, which pipelines and/or data sets are affected, metrics related to the fault, textual, audial, and/or graphical descriptions of the fault, and so forth.

In an embodiment, the tests 700 implemented by a plugin inspect the log files for explicit incidents of fault or potential faults detected by the data pipeline system 310. Additionally or alternatively, the plugin may be configured to inspect messages pushed from the data pipeline system 310 indicating faults or potential faults. Since the determination of whether a fault occurred has already been performed by the fault detection system 340, some embodiments may only filter and/or reformat the received data to ease processing by the analysis aggregator 506 and/or client communication interface 507. However, in other embodiments, the plugin may be configured to double check the results by re-performing the tests with the same or enhanced information from the data sources 320 and/or data sinks 330. For example, the data pipeline system 310 may perform a volume check based on the pre-transformed and post-transformed data sets stored in the data lake 313 and determine that there is a potential fault. The plugin may instead contact the data sources 320 and/or data sinks 330 to determine whether the volumes of the data at each site is in concord with the determination performed by the data pipeline system 310. If the issue is consistent, the status may be updated to fault from potential fault. Otherwise, the status may remain at potential fault. Furthermore, in some embodiments, a fault or potential fault received from the data pipeline system 310 may cause the plugin to perform additional or more detailed tests 700 than those performed by the data pipeline system 310.

In an embodiment, the result of the tests 700 may involve storing data in the analysis storage subsystem 305 specifying one or more of: a time the fault occurred, the data/metadata generated by the data pipeline system 310 in relation to the fault, a description of the fault, a status indicator, and so forth.

The configuration points for log file/alert tests may include the pipeline(s) to perform the tests 700 on, the dataset(s) to perform the tests 700 on, the schedule for performing the tests 700, the format in which the data pipeline system 310 presents information related to faults and/or potential faults, a function for reformatting the aforementioned fault/potential fault information for consumption by the analysis aggregator 506, and so forth.

4.4 Utilizing Machine Learning in Plugin Tests

In some embodiments, the plugins 603 define tests 700 which utilize machine learning techniques. For example, machine learning techniques may be used to alleviate the need for manually defined configuration points 701 by allowing the plugins 603 to learn one or more variables, such as the specific thresholds to map to various status indicators. The exact machine learning technique used to implement the tests 700 is not critical and virtually any machine learning technique can be accommodated by the plugin architecture described herein. For example, machine learning techniques employed by the plugins 603 may be based on artificial neural networks, support vector machines, Bayesian models, Markov models, and so forth without limitation.

Many machine learning techniques, specifically classifiers, involve the estimation of a function that maps between a set of inputs (often referred to as features) and a set of outputs (often referred to as classes or labels). The estimation of the function, referred to as "training", is typically performed by analyzing a "training set" of features and their corresponding labels.

During the analysis, an optimization is performed to find the function that best explains the mapping between the features and the corresponding labels. The terms "best" and/or "optimum" as used in this section do not necessarily mean a global maximum. In many cases a local maximum of the likelihood of the mapping between the features and the label given the function is sufficient. Different machine learning techniques perform the aforementioned optimizations in different ways. For example, naive Bayes classifiers assume independence of the features given the class and estimate a function that explains the association between the features and the label. As another example, artificial neural networks model the problem domain as systems of interconnected nodes (representing "neurons") which send messages to one another, often with some nodes representing the inputs, some nodes representing intermediary or "hidden" nodes, and some nodes representing the outputs. Thus, in such models, the estimation of the function involves determining the optimal weights between the edges connecting the nodes that are most likely to explain the mappings presented in the training set.

In the present problem domain, the features are metrics associated with the pipelines 410 and the label is a status indicator (e.g. fault, potential fault, OK, etc.). The exact metrics to use as the features is dependent on the potential issues that the plugin is designed to monitor. For example, the volume tests described earlier, in some embodiments, are represented by a plugin that includes a configuration point for specifying the volume thresholds that map to various status indicators. Instead of setting the thresholds as configuration points 701, the plugin could instead be configured to inspect a historical training set of data from the pipeline (or some base model or simulation similar to the pipeline) and estimate a function that could be used to determine which status indicator to label new volume measurements with.

For example, the training set may include features such as data volume, day of the week the data volume was measured, month the data volume was measured, whether the data volume was measured on a special type of day (such as a holiday), and so forth, with the label for each instance being the status indicator. After training a mapping function using any appropriate machine learning technique, the plugin can then use that function to estimate whether a fault occurred based on new instances of those features collected by the data collection scheduler 502. Thus, the plugin is capable of determining the appropriate thresholds for triggering an alert based on the data volume measured for a particular pipeline based on historic measurements.

In some embodiments, plugins 603 which implement machine learning techniques may still include configuration points 701 to collect information such which pipelines 410 to monitor, where the training data is located, which datasets to monitor, which machine learning technique to use to perform the estimation, and so forth. Furthermore, the configuration points 701 may be specific to the type of machine learning performed, such as defining the nodes and/or configuration nodes of an artificial neural network that will be used to produce the classification.

In some embodiments, plugins 603 which implement machine learning techniques may be retrained in response to a user submitting a new training set via one or more interfaces produced by the client communication interface 507 and displayed by the client application 350. However, in other embodiments, plugins 603 which implement machine learning techniques may be configured to collect new instances or data points based on data periodically collected by the data collection scheduler 502. For example, the plugins 603 may be configured to retrain every set period of time or may be configured as an online learner that updates the function after each new data point is encountered.

5.0 Example User Interfaces

As described above in Section 3.4.8 "Client Communication Interface", the client communication interface 507 may represent a web service/server that is configured to display one or more web pages which provide a Graphical User Interface (GUI) for a user to interact with to review information from and/or submit commands to the fault detection system 340. The following are non-limiting examples of web interfaces that could be generated by the client communication interface 507 for various tasks, such as displaying general status information, displaying status information for specific tests, managing alerts, configuring plugins 603, and so forth.

5.1 General Status Interface

FIG. 8 illustrates an example user interface for displaying a general status table according to an embodiment. In FIG. 8, the general status interface 800 includes view widget 801, start date widget 802, end date widget 803, submit widget 804 (collectively the display option widgets 806) and status table 805.

In an embodiment, the view widget 801 allows the user to select between multiple "view formats" which control features such as which pipelines, time periods, data sets, tests, and so forth will be used as indices for the aggregation(s) performed by the analysis aggregator 506. The views that are selectable by the view widget 801 may be pre-programmed or set by a user of the client application 350. For example, although not depicted in FIG. 8, the general status interface 800 may include an option in the view widget 801 that allows a new view to be defined by displaying a form through which the user can select which features and at which granularities will be aggregated to drive the display of the status table 805. For example, the user may define a view where the status is aggregated over pipeline and date ranges, with each date range being set to a granularity of a day. The definition of the new view is then submitted by the client application 350 to the client communication interface 507 and/or analysis aggregator 506 for storage in the analysis storage subsystem 505. As a result, when the general status interface 800 is revisited by the user in the future, the newly defined view becomes available in a dropdown list accessible through the view widget 801.

In an embodiment, the status table 805 is represented as a matrix where each element is defined by a date index and a pipeline index, with the element itself being displayed with the aggregated status of the tests pertaining to the pipeline and date.

In an embodiment, start date widget 802 and end date widget 803 define the time periods over which status indicators will be displayed in the status table 805. In FIG. 8, the start date has been set to Jan. 1, 2015 and the end date has been set to Jan. 6, 2015, causing the status table 805 to be displayed with columns representing the specified range of dates.

In an embodiment, the submit widget 804 represents a widget (such as a button) that can be selected after the view widget 801, start date widget 802, and end date widget 803, have been set to signal the analysis aggregator 506 to generate a data structure representing the relationships and information specified by the aforementioned widgets. Upon receiving the data structure back from the analysis aggregator 506, the status table 805 is populated with the aggregated status of the tests represented by each element of the status table 805 as indicated by the data structure. Thus, in some embodiments, the status table 805 is initially blank until the display option widgets 806 have been used to set and submit the display options.

In an embodiment, the status table 805 represents the aggregations generated by the analysis aggregator 506. In FIG. 8, the status table 805 includes two indices, the first being the pipeline being monitored and the second being the date on which the fault detection tests were performed or alternatively the date on which the data being tested was collected. For example, in some embodiments the data analysis subsystem 504 may perform tests on a routine schedule, such as once a day. However, in other embodiments, the data analysis subsystem 504 may perform tests in batches, such as collecting data for a week and running the tests for each day at the end of each week. Each element of the status table 805 displays a status indicator representing the aggregated status of the fault detection tests performed for that pipeline and time period. For example, as discussed above with respect to the analysis aggregator 506, the status could be aggregated by using the worst case status for any of the tests 700 represented by the element. In some embodiments, each element of the status table 805 is displayed as a widget which can be selected to "drill down" into the status to display more detailed information, such as the exact plugins/tests/subtests and status of each that pertain to the selected pipeline and time period.

5.2 Test Status Interface

FIG. 9 illustrates an example user interface for displaying a test status table according to an embodiment. In FIG. 9, the test status interface 900 includes a test status table 901 that displays the individual tests performed for a given pipeline and time period.

In an embodiment, the test status interface 900 is presented to the user via the client application 350 in response to the user selecting an element from the status table 805 of the general status interface 800. For example, each element of the status table 805 may be configured as a widget which, when selected by a user of the client application 350, causes the client application 350 to send a request to the client communication interface 507 for a more detailed interface relating to the selected pipeline and time period. In response, the client communication interface 507 generates the test status interface 900 and returns the test status interface 900 to the client application 350 for display. For example, the data structure generated by the analysis aggregator 506 may include multiple tiers of nodes, with the first tier representing the elements of the status table 805 and the second tier representing the individual tests performed for the pipelines/date ranges represented by the elements of the status table 805. Thus, to generate the test status interface 900, the client communication interface 507 may drill down from the first tier to the second tier and construct the test status table 901 from the nodes encountered at that level.

In an embodiment, each row of the test status table 901 identifies the name of the test performed and a status indicator representing the result of that test.

In some embodiments, the test status interface 900 includes a header or other area that identifies the pipeline and date range for the selected element of the status table 805.

In an embodiment, the test status table 901 is configured to present each test either as or in the vicinity of a widget which, when selected by a user of the client application 350, causes the client application 350 to display an interface which drills down into additional details and configurations related to the selected test.

Although the tests themselves have been described in the above example as the index for the test status table 901, in other embodiments another index or hierarchy could be utilized. For example, assuming the plugins 603 are configured to perform multiple tests and/or subtests, the second-tier test status interface 900 could be configured to display the aggregated status for each plugin enabled for the selected pipeline and time period. In which case, the test status table 901 may include widgets for delving deeper and displaying detailed information for the individual tests 700 performed by each plugin. There is virtually no limit on the indices that could be used to develop each tier of the hierarchy of display information or the level of granularity at which status and other metrics are aggregated within each tier.

However, in other embodiments, the instructions sent by the client communication interface 507 that cause the client application 350 to generate the general status interface 800 includes instructions which allow the client application 350 to generate the test status interface 900 without sending a further request to the client communication interface 507. For example, the instructions sent to generate the general status interface 800 may already include instructions and/or the data required by the client application 350 to generate the test status interface 900 in response to user selection of an element of the status table 805.

In various embodiments, test status interface 900 may be a new interface, a pop-up interface that is presented simultaneously with the general status interface 800, presented through an additional tab by the client application 350, an updated version of the general status interface 800, a subsection of the general status interface 800, and so forth.

5.3 Alert Interface

Figure 10:
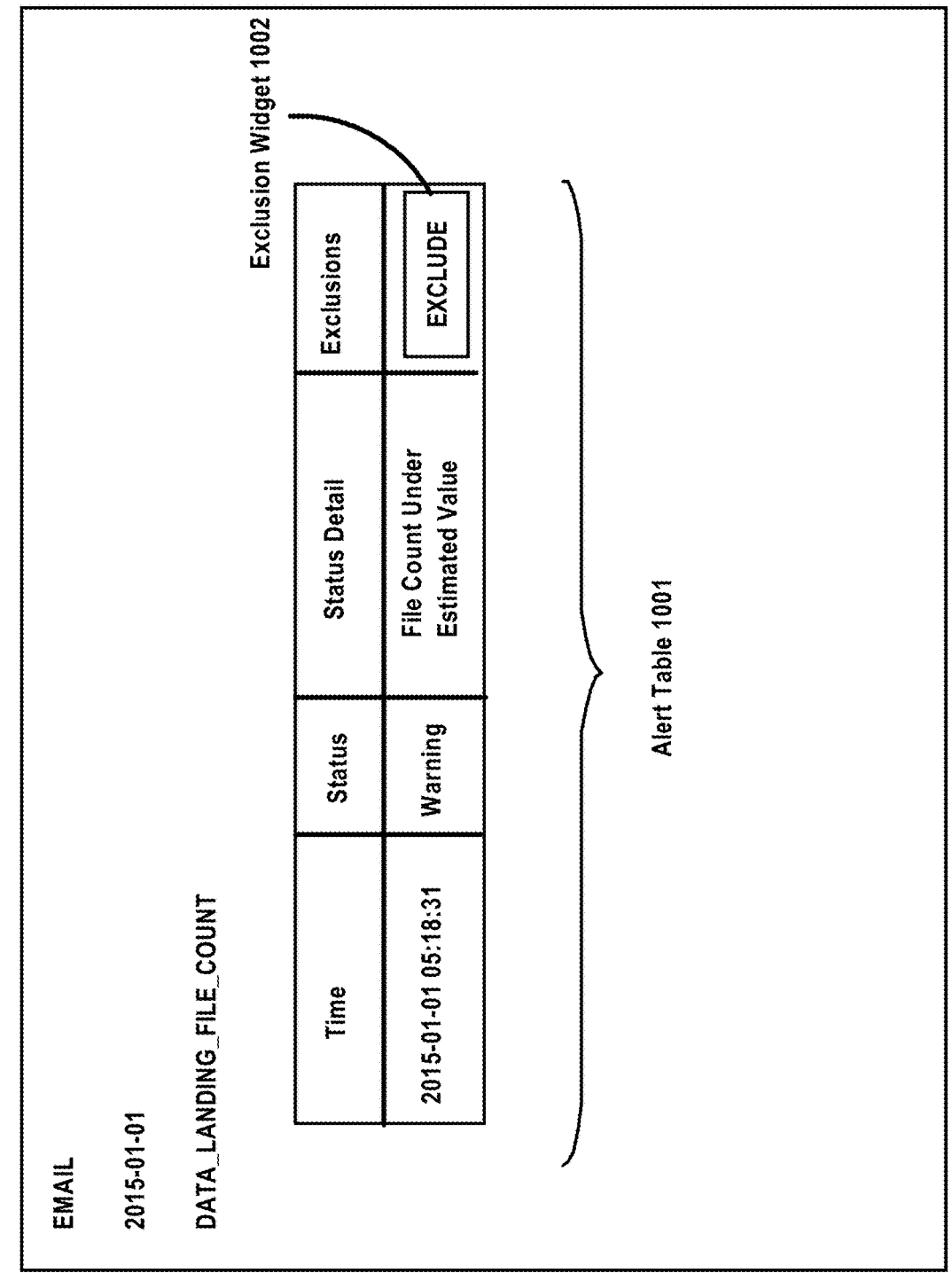
FIG. 10 illustrates an example user interface for displaying an alert table according to an embodiment.

FIG. 10 illustrates an example user interface for displaying an alert table according to an embodiment. In FIG. 10, the alert interface 1000 includes an alert table 1001 which displays information related to the outcome of a particular test and an exclusion widget 1002 for silencing an alert generated by the test.

In an embodiment, alert interface 1000 is displayed by the client application 350 in response to receiving user input selecting a test from the test status table 901. For example, specific elements of the test status table 901 may be configured as a widget which, when selected by a user of the client application 350, causes the client application 350 to send a request to the client communication interface 507 for a more detailed interface relating to the selected test. In response, the client communication interface 507 generates the alert interface 1000 and returns the alert interface 1000 to the client application 350 for display. For example, the data structure generated by the analysis aggregator 506 may include multiple tiers of nodes, with the first tier representing the elements of the status table 805, the second tier representing the test status table 901, and the third tier representing the information for a specific node that in turn represents the selected test displayed in the alert table 1001. Thus, to generate the alert interface 1000, the client communication interface 507 may drill down from the second tier to the third tier and construct the alert table 1001 from the node representing the selected test.

In an embodiment, the alert table 1001 includes information such as, the time the selected test was performed, the time frames over which the data utilized by the test was collected, the status indicator for the selected test, details related to the status (e.g. explanatory messages, statistics related to the test, metrics related to the test, etc.), and an exclusion widget 1002 for silencing the test. As described earlier, the analysis aggregator 506 in some embodiments aggregates test status by using the worst status indicator of the tests that fall under that aggregation. This alerts a user of the client application 350 as to which pipelines, data sets, dates, tests, and so forth that the user should look into to see faults and/or potential faults. If upon inspecting the test displayed in the alert interface 1000, the user may determine that there is in fact is no fault, that the fault is not important, or that the issue has been independently resolved, the user can silence the alert using the exclusion widget 1002.

The exclusion widget 1002, when selected, causes the client application 350 to ignore the status of that test when generating various tables, such as status table 805 and test status table 901. For example, treating the status as though the status were "OK". Thus, reducing the likelihood of the user duplicating the work of inspecting the same tests which have already been resolved in some manner. In some embodiments, the exclusion widget 1002 is configured to cause the client application 350 to communicate the exclusion to the fault detection system 340 so that the analysis aggregator 506 knows to treat the status as "OK" for future sessions either for this particular user or all users generally during future sessions. For example, the analysis aggregator 506 and/or client communication interface 507 may store a flag in the analysis storage subsystem 505 indicating whether the current user has already decided to exclude the status of the test.

In some embodiments, the alert interface 1000 includes a header or other area that identifies the test along with the pipeline and date range to which the test pertains.

However, in other embodiments, the instructions sent by the client communication interface 507 that causes the client application 350 to display the test status interface 900 includes instructions which allow the client application 350 to generate the alert interface 1000 without sending a further request to the client communication interface 507. For example, the instructions sent to generate the test status interface 900 may already include instructions and/or data required by the client application 350 to generate the alert interface 1000 in response to user selection of an element of the test status table 901.

In various embodiments, alert status interface 900 may be a new interface, a pop-up interface that is presented simultaneously with the test status interface 900, presented through an additional tab by the client application 350, an updated version of the test status interface 900, a sub-section of the test status interface 900, and so forth.

5.4 Plugin Configuration Interface

Figure 11:
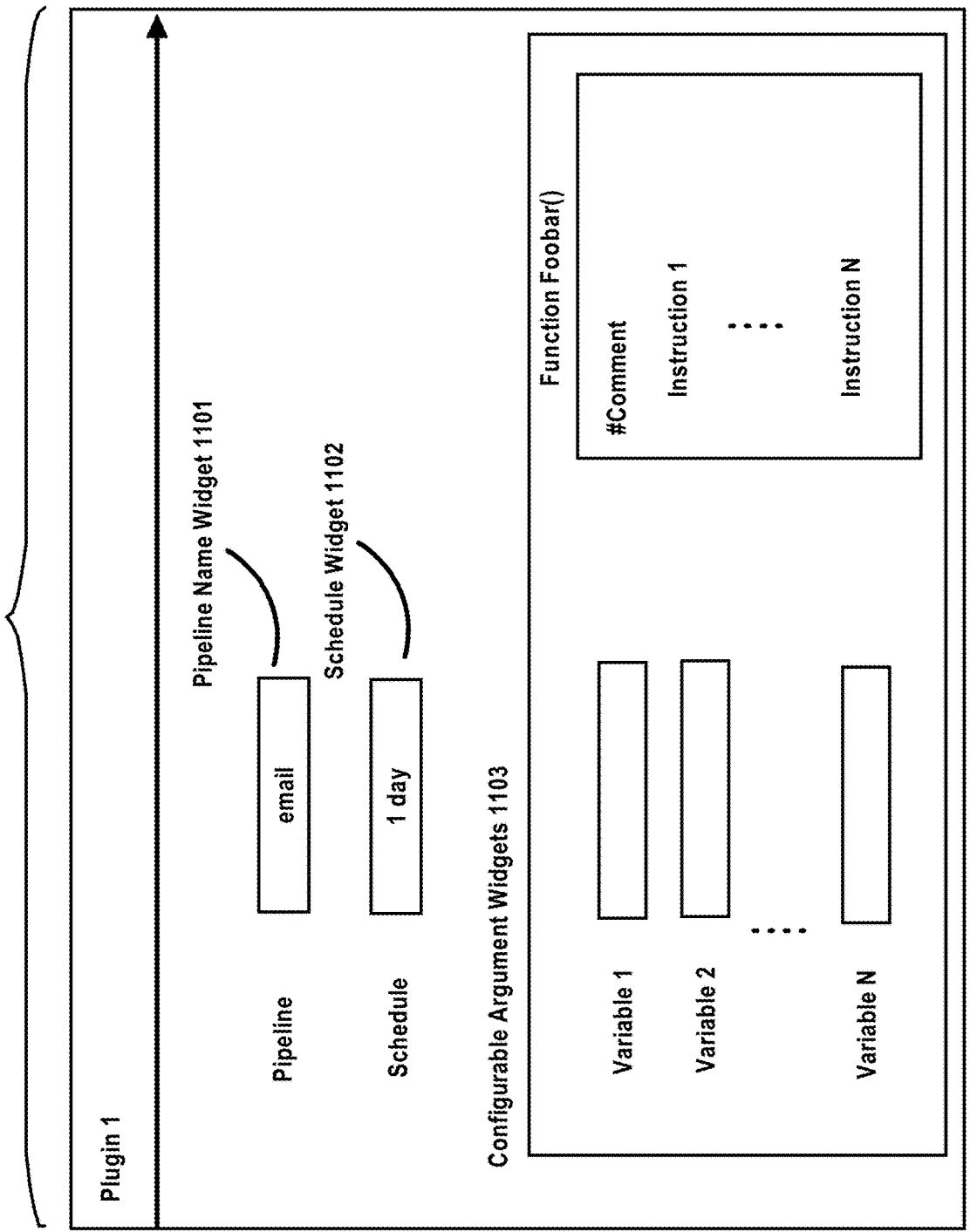
FIG. 11 illustrates an example user interface for configuring a plugin according to an embodiment.

FIG. 11 illustrates an example user interface for configuring a plugin according to an embodiment. In FIG. 11, the plugin configuration interface 1100 is an interface for setting the configuration points 701 of a plugin using a number of widgets, including a pipeline name widget 1101, a schedule widget 1102, and configurable argument widgets 1103.

In an embodiment, the plugin configuration interface 1100 is displayed in response to uploading a plugin to the fault detection system 340 in order to collect information for the configuration points 701. For example, the client application 350, via instructions received from the client communication interface 507, may generate a home interface, upload interface, or other type of interface through which a user of the client application 350 can submit the instructions and/or metadata that comprises a plugin. In response to receiving the plugin, the fault detection system 340, via data analysis subsystem 504 and/or client communication interface 507, inspects the configuration points 701 defined by the plugin and generates instructions which, when executed by the client application 350, cause the client application 350 to display the plugin configuration interface 1100. The client communication interface 507 then provides the instructions to the client application 350 to display the plugin configuration interface 1100 to the user.

In some embodiments, the client communication interface 507 is configured to allow users to revisit the plugin configuration interface 1100 to update the configuration points 701 of the plugin after being set initially. For example, the client communication interface 507 may cause display of an interface that lists all currently loaded plugins 603 and allows for selection of a plugin from the list to cause generation of the plugin configuration interface 1100 for the selected plugin.

In an embodiment, the pipeline name widget 1101 allows a user of the client application 350 to select which pipeline or pipelines the tests 700 defined by the plugin will be executed against. In other embodiments, the pipeline name widget 1101 may also be supplemented by widgets for defining specific data sets to execute the tests 700 against. Furthermore, in some embodiments, the plugin configuration interface 1100 displays widgets for setting the location or locations from which the specified data should be collected (e.g. from the data sources 320, data sinks 330, data lake 313, and so forth).

In an embodiment, the schedule widget 1102 allows a user of the client application 350 to select a reoccurring period of time for performing the test. For example, every hour, day, month, year, and so forth. However, in other embodiments, rather than a set period of time, the schedule widget 1102 may allow scheduling as triggers based on specific events other than time. For example, in response to receiving a message from the data pipeline system 310 indicating a fault or potential fault, in response to determining that the monitored pipeline or data set has collected a threshold amount of data, and so forth.

In an embodiment, the configurable argument widgets 1103 allows the user of the client application 350 to set the value of variables defined by the configuration points 701 that are used within the instructions representing the tests 700. Furthermore, in addition to variables, the configurable argument widgets 1103 allow sets of instructions, such as functions, that are defined as configuration points 701 within the plugin to be implemented by the user. In some embodiments, all configuration points 701 are defined as configurable arguments and therefore are set via the configurable argument widgets 1103. However, the plugin architecture may be designed to allow certain configuration points 701, such as pipeline and schedule, to be made common for all plugins 603. Thus, pipeline name widget 1101 and schedule widget 1102 may be pre-programmed to be displayed in a particular area or manner for all plugins 603, whereas the configurable argument widgets 1103 represent the variables and/or functions unique to each plugin.

In an embodiment, after the configuration points 701 have been set via the pipeline name widget 1101, schedule widget 1102, and configurable argument widgets 1103, the client application 350 communicates the specified information to the client communication interface 507 for storage in the plugin configuration data 602. At this point sufficient information to execute the tests 700 of the plugin has been collected and the data analysis subsystem 504 registers the plugin with the data collection scheduler 502 so that the required data will be collected from the pipelines 410.

6.0 Example Method for Detecting Faults Using Plugins

Figure 12:
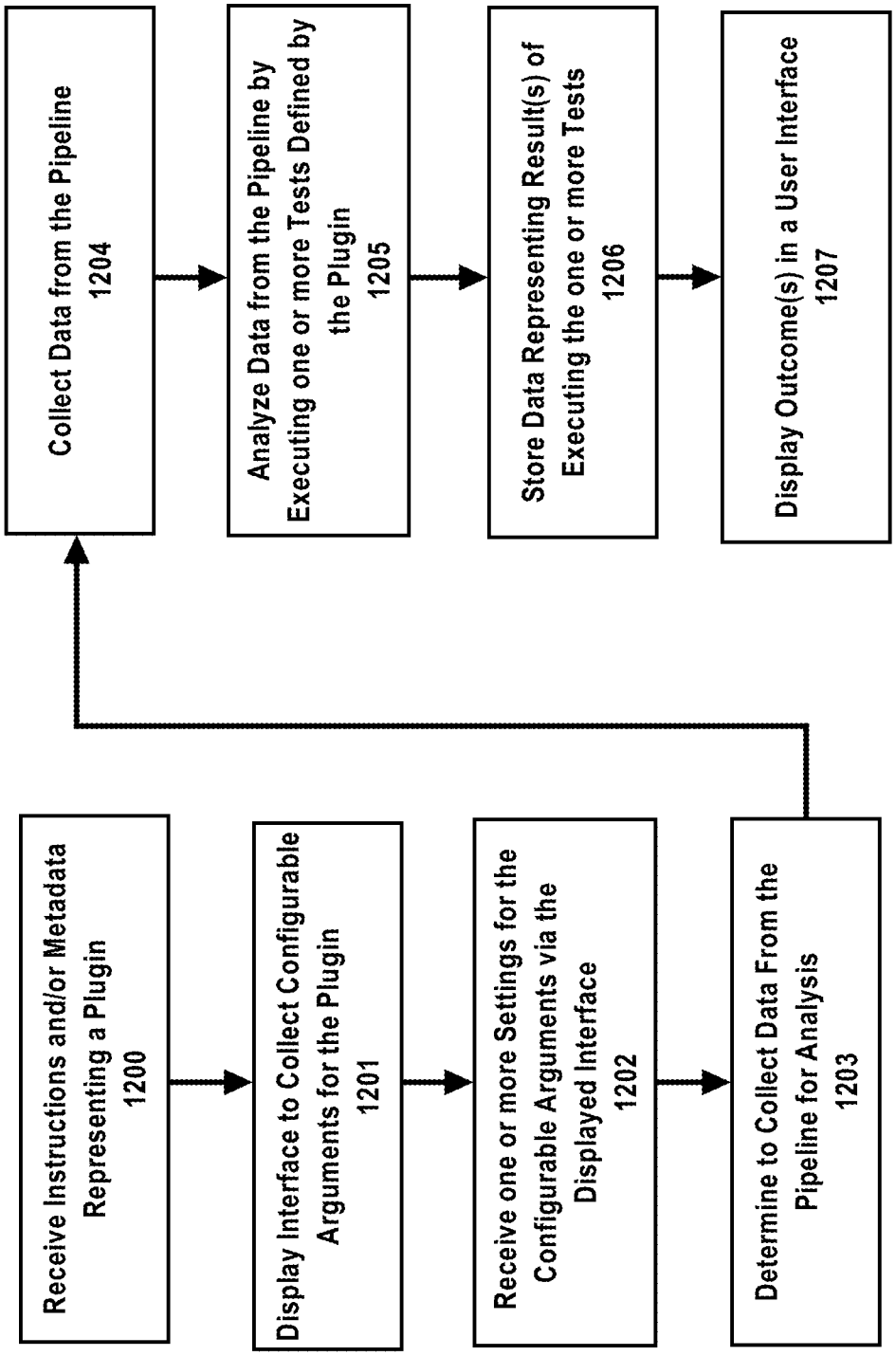
FIG. 12 is a block diagram representing a method for performing fault detection tests on a pipeline using a plugin according to an embodiment.

FIG. 12 is a block diagram representing a method for performing fault detection tests on a pipeline using a plugin according to an embodiment. Although the block diagram of FIG. 12 depicts the blocks in a particular order, other embodiments may perform the steps represented by the blocks in a different order than the blocks appear. Furthermore, some embodiments may add new blocks, delete blocks, merge blocks, divide out blocks, and so forth compared to the block diagram illustrated in FIG. 12. To illustrate clear examples, the steps represented by the blocks of FIG. 12 will be discussed with reference to the components of the fault detection system 340.

At block 1200, the client communication interface 507 receives instructions and/or metadata representing a plugin. In an embodiment, the client communication interface 507 is implemented as a web server that is configured to communicate with the client application 350 over a protocol, such as HTTP. In such embodiments, the client communication interface 507 generates and provides a web page comprising one or more instructions (e.g. HTML instructions, CSS instructions, JavaScript instructions, and so forth) that, when executed by the client application 350, causes the client application 350 to display an interface through which the instructions and/or metadata representing the plugin can uploaded. For example, the web page may include a widget that allows a user of the client application 350 to select the instructions and/or metadata representing a locally stored plugin or other storage location. When the widget is selected, the client application 350 sends the instructions and/or metadata to the client communication interface 507 in one or more HTML POST messages. In some embodiments, the instructions and/or metadata for the plugin define one or more tests 700 to perform on one or more of the pipelines 410 and one or more configuration points 701 representing configurable arguments (e.g. variables and/or functions) that can be used to customize the tests 700 for the specific operating environment of the monitored pipeline.

At block 1201, the client communication interface 507 causes a user interface to be displayed by the client application 350 that is configured to collect configurable arguments for the configuration points of the plugin. In an embodiment, when the plugin is received by the client communication interface 507, the client communication interface 507 sends the plugin to the data analysis subsystem 504 for storage and processing. If the plugin defines configuration points 701, the data analysis subsystem 504 identifies the variables and/or functions that need to be supplied and communicates that information back to the client communication interface 507. In response, the client communication interface 507 generates a web page that contains widgets for defining the configuration points 701 and sends the web page to the client application 350 for display. However, in other embodiments, the identification of the configuration points 701 may be performed by a different component, such as the client communication interface 507. FIG. 11, described in more detail above in Section 5.4, is an example of an interface that can be generated by the client communication interface 507 to collect data for the configuration points 701 from the client application 350.

At block 1202, the client communication interface 507 receives one or more settings for the configurable arguments via the displayed interface of the client application 350. In an embodiment, the web page displayed by the client application 350 includes a number of widgets, such as fields, which allow a user to fill in information for the configuration points 701. Furthermore, the web page may display an additional widget, such as a "submit" button, that causes the settings for the configuration points 701 to be communicated to the client communication interface 507. For example, the variables and functions that comprise the configuration points 701 may be uploaded using one or more HTML POST messages sent to the client communication interface 507. In some embodiments, when the client communication interface 507 receives the settings for the configuration points 701, the client communication interface passes the settings to the data analysis subsystem 504 for storage in the plugin configuration data 602.

At block 1203, the data collection scheduler 502 determines to collect data from the pipeline monitored by the plugin. In an embodiment, when the data analysis subsystem 504 receives the one or more settings for the configurable arguments of the plugin, the data analysis subsystem 504 registers the plugin with the data collection scheduler 502. For example, the data analysis subsystem 504 may specify which pipeline to collect data from for analysis, what dataset to pull data from, what type or types of information should be collected, how often the data should be collected, and so forth. In an embodiment, once a plugin is registered with the data collection scheduler 502, the data collection scheduler 502 determines to collect the data from the monitored pipeline based on a reoccurring period of time defined by one of the configuration points 701. For example, the data collection scheduler 502 may have access to a system clock and can measure the delta between the last time the data was collected for testing and the current time. If the delta exceeds the period of time defined by the configuration points 701, the data collection scheduler 502 determines to collect data from the pipeline monitored by the plugin.

At block 1204, the data collection scheduler 502 collects data from the pipeline monitored by the plugin. In an embodiment, the data collection scheduler 502 collects data from the monitored pipeline using the pipeline communication interface 500. In an embodiment, the pipeline communication interface 500 may be programmed to communicate with the data pipeline system 310, the data sources 320, and/or the data sinks 330 using the protocols expected by each element. For example, the protocol used to collect data from the data pipeline system 310, the data sources 320, and/or the data sinks 330 can be collected via well-known protocols, such as HTTP, File Transfer Protocol (FTP), Simple Network Management Protocol (SNMP), and so forth or any number of propriety protocols unique to those elements. Once the data is collected, the data collection scheduler 502 stores the data in the data storage subsystem 503 and signals the data analysis subsystem 504 to perform the tests 700.

At block 1205, the data analysis subsystem 504 analyzes the collected data from the pipeline by executing the one or more tests 700 defined by the plugin. In an embodiment, the data analysis subsystem 504 executes the one or more instructions of the plugin that implement the tests 700 using the settings for the configuration points 701 stored in the plugin configuration data 602 in association with the plugin and the relevant data stored in the data storage subsystem 503 by the data collection scheduler 502. In an embodiment, executing the tests 700 generates one or more results, which may include one or more status indicators specifying whether a fault, potential fault, or no fault has occurred, and/or one or more metrics related to the tests 700. For example, if the tests 700 check whether the volume of data passing through the pipeline dipped below a threshold, the one or more metrics may include the actual measured volume of data compared to the expected volume.

At block 1206, the data analysis subsystem 504 stores one or more results of executing the one or more tests 700 in the analysis storage subsystem 505. In an embodiment, when the data analysis subsystem 504 generates the one or more results, which may include the status indicator and one or more metrics related to the tests 700, the data analysis subsystem 504 stores those results in the analysis storage subsystem 505. The results may be indexed or tagged with metadata to allow the analysis aggregator 506 to search for results pertaining to specific pipelines, specific plugins, specific types of tests, and so forth.

At block 1207, the client communication interface 507 causes the one or more results to be displayed by the client application 350 in a user interface. In an embodiment, the client communication interface 507 causes the one or more results to be displayed by the client application 350 in response to receiving an HTTP request referencing a health status page for the pipelines 410. Upon receiving the request, the client communication interface 507 accesses a data structure that was produced by the analysis aggregator 506, based at least in part on the results stored in the analysis storage subsystem 505, which represents a hierarchy of pipeline health information that can be used to generate one or more interfaces for displaying the current health of the pipelines 410. A more detailed explanation of how the analysis aggregator 506 functions in particular embodiments is provided above in Section 3.4.7. Based on the data structure, the client communication interface 507 generates one or more interfaces that are sent to the client application 350 for display. For example, FIG. 8, FIG. 9, and FIG. 10, which are described in most detail above, are example interfaces that may be presented to a user through the client application 350 to present the health reports for the pipelines 410.

7.0 Extensions and Alternatives

While the invention is described in some detail with specific reference to a single-preferred embodiment and certain alternatives, there is no intent to limit the invention to that particular embodiment or those specific alternatives. Therefore, those skilled in the art will appreciate that modifications may be made to the preferred embodiment without departing from the teachings of the present invention.

8.0 Additional Disclosure

Additional embodiments are described by the following numbered clauses:

1. A method for detecting faults related to a pipeline of a data pipeline system comprising: a fault detection system receiving a plugin comprising a) one or more instructions representing a test to perform on the pipeline and b) one or more configuration points representing one or more configurable arguments for the plugin; wherein the pipeline receives data from one or more data sources and applies one or more transformations to the data before storage in one or more data sinks; the fault detection system receiving one or more settings corresponding to the one or more configuration points; the fault detection system receiving test data from the pipeline, wherein the test data comprises at least one of: the data before the one or more transformations, the data after the one or more transformations, the data after at least one transformation of the one or more transformations, a sample of the data before the one or more transformations, a sample of the data after the one or more transformations, a sample of the data after at least one transformation of the one or more transformations, one or more metrics related to the data before transformation, one or more metrics related to the data after transformation, or one or more metrics related to the data after at least one transformation of the one or more transformations; in response to determining to run the test defined by the plugin on the pipeline, the fault detection system executing the one or more instructions of the plugin based on the one or more settings for the one or more configuration points and the test data, wherein a result of executing the one or more instructions includes at least a status indicator; the fault detection system causing display of an interface that presents at least the status indicator for the pipeline.

2. The method of Clause 1, wherein determining to run the test is performed based on a configuration point of the one or more configuration points that defines a time interval for periodically executing the test.

3. The method of any of Clauses 1-2, wherein the one or more instructions perform the test by validating the test data against on one or more of: one or more schemas specifying how data is stored by the one or more data sources or one or more schemas specifying how data is stored by the one or more data sinks.

4. The method of any of Clauses 1-3, wherein the one or more instructions perform the test by measuring a volume of the data passing through the pipeline and comparing the volume to one or more thresholds.

5. The method of Clause 4, wherein the one or more thresholds are defined by the one or more configuration points.

6. The method of any of Clauses 1-5, wherein the test is performed by training a classifier based on a historical sample of the data and, after the classifier has been trained, using the classifier to predict a status indicator based on the test data.

7. The method of any of Clauses 1-6, wherein the classifier is implemented using an artificial neural network.

8. The method of any of Clauses 1-7, wherein the status indicator is one of a plurality of status indicators that include at least a status representing that a fault occurred with the pipeline, a status representing that a fault has potentially occurred with the pipeline, and a status representing that no fault has occurred with the pipeline.

9. The method of any of Clauses 1-8, wherein the f interface represents web pages comprising one or more of: Hypertext Markup Language (HTML) instructions, JavaScript instructions, or Cascading Style Sheet (CSS) instructions.

10. The method of any of Clauses 1-9, wherein the data pipeline system includes a plurality of pipelines and the interface displays a plurality of status indicators, each status indicator of the plurality of status indicators relating to a plurality of tests performed on a particular pipeline during a particular time period.

11. The method of Clause 10, wherein each status indicator of the plurality of status indicators is generated by using a worst status indicator among status indicators for the plurality of tests performed on the particular pipeline during the particular time period.

12. The method of Clause 11, wherein each particular status indicator of the plurality of status indicators is displayed as or in relation to a widget which, when selected, causes display of a second interface that presents the plurality of tests for the particular pipeline during the particular time period.

13. The method of Clause 12, wherein each particular test of the plurality of tests is displayed in the second interface as or in relation to a widget which, when selected, causes display of a third interface that presents detailed information for the particular test.

14. The method of Clause 13, wherein the detailed information for the particular test is displayed in relation to a widget which, when selected, causes a status indicator of the particular test to be treated as though no fault was detected.

15. The method of any of Clauses 1-14, wherein the one or more configuration points include one or more of: variables referenced by the one or more instructions or functions reference by the one or more instructions.

16. The method of any of Clauses 1-15, wherein the one or more instructions perform the test by inspecting log data generated by the data pipeline system for one or more results of the data pipeline system executing one or more checks for faults involving the pipeline.

17. The method of any of Clauses 1-16, wherein the interface is displayed via a client application.

18. The method of Clause 17, wherein the client application is a browser or a browser-enabled application.

19. The method of any of Clauses 17-18, wherein the fault detection system receives the plugin via the client application.

20. One or more non-transitory computer-readable media storing instructions that, when executed by one or more computing devices, causes performance of any one of the methods recited in Clauses 1-19.

21. A system comprising one or more computing devices comprising components, implemented at least partially by computing hardware, configured to implement the steps of any one of the methods recited in Clauses 1-19.

The invention claimed is:

1. A method for detecting faults related to a data pipeline system, the method comprising:
at one or more computing devices comprising one or more processors and memory storing one or more computer programs executed by the one or more processors to perform the method, performing operations comprising:
receiving a plugin comprising one or more instructions representing a test to perform on the data pipeline system and one or more configuration points;
wherein the data pipeline system is configured to receive source data from one or more data sources and configured to apply one or more transformations to the source data to produce transformed data before storage of the transformed data in one or more data sinks;
receiving test data from the data pipeline system;
wherein the test data received from the data pipeline system comprises a metric reflecting an amount of the transformed data after the one or more transformations;
determining to run the test defined by the plugin on the data pipeline system including executing the one or more instructions of the plugin based on the test data, wherein a result of executing the one or more instructions includes at least a test result status indicator; and
causing display of a graphical user interface that presents at least the test result status indicator.

2. A fault detection system for detecting faults related to a data pipeline system, the fault detection system comprising:
storage media;
one or more processors; and
one or more programs stored in the storage media and configured for execution by the one or more processors, the one or more programs comprising instructions for:
receiving a) one or more instructions representing a test to perform on data processed by the data pipeline system and b) one or more configuration points, wherein the data pipeline system is configured to receive source data from one or more data sources and configured to apply one or more transformations to the source data to produce transformed data before storage of the transformed data in one or more data sinks; and
receiving test data from the data pipeline system;
determining to run the test on the data pipeline system including executing the one or more instructions based on one or more settings for the one or more configuration points and the test data, wherein a result of executing the one or more instructions includes at least a test result status indicator;
wherein the test result status indicator is based, at least in part, on the result of executing the one or more instructions including determining:
(a) whether a sample contains a correct number of columns according to a schema for the transformed data,
(b) whether data in each column of the sample adheres to a data type of the column as specified in a schema for the transformed data,
(c) whether data in each column of the sample improperly contains NULL values according to a schema for the transformed data, or
any combination of (a), (b), or (c); and
causing display of a graphical user interface that visibly presents at least the test result status indicator.

3. The fault detection system of claim 2, wherein determining to run the test is performed based on a configuration point of the one or more configuration points that defines a time interval for periodically executing the test.

4. The fault detection system of claim 2, wherein the test is performed by training a classifier based on a historical sample of the transformed data and, after the classifier has been trained, using the classifier to predict a test result status indicator based on the test data.

5. The fault detection system of claim 4, wherein the classifier is implemented using an artificial neural network.

6. The fault detection system of claim 2, wherein the test result status indicator is one of a plurality of test result status indicators that include at least a test result status representing that a fault occurred with the data pipeline system, a test result status representing that a fault has potentially occurred with the data pipeline system, and a test result status representing that no fault has occurred with the data pipeline system.

7. The fault detection system of claim 2, wherein the data pipeline system includes a plurality of pipelines and the graphical user interface displays a plurality of test result status indicators, each test result status indicator of the plurality of test result status indicators relating to a plurality of tests performed on a particular pipeline during a particular time period.

8. The fault detection system of claim 7, wherein each test result status indicator of the plurality of test result status indicators is generated by using a worst test result status indicator among test result status indicators for the plurality of tests performed on the particular pipeline during the particular time period.

9. The fault detection system of claim 8, wherein each particular test result status indicator of the plurality of test result status indicators is displayed as or in relation to a widget which, when selected, causes display of a third graphical user interface that presents the plurality of tests for the particular pipeline during the particular time period.

10. The fault detection system of claim 9, wherein each particular test of the plurality of tests is displayed in the third graphical user interface as or in relation to a widget which, when selected, causes display of a fourth graphical user interface that presents detailed information for the particular test.

11. The fault detection system of claim 10, wherein the detailed information for the particular test is displayed in relation to a widget which, when selected, causes a test result status indicator of the particular test to be treated as though no fault was detected.

12. The fault detection system of claim 2, wherein the one or more configuration points include one or more of: variables referenced by the one or more instructions or functions referenced by the one or more instructions.

13. The fault detection system of claim 2, wherein the one or more instructions perform the test by inspecting log data generated by the data pipeline system for one or more results of the data pipeline system executing one or more checks for faults involving the data pipeline system.

14. The fault detection system of claim 2, wherein the graphical user interface is displayed via a client application.

15. The fault detection system of claim 14, wherein the fault detection system receives the one or more instructions via the client application.

16. The fault detection system of claim 2, wherein the test data comprises a sample of the source data before the one or more transformations.

17. The fault detection system of claim 16, wherein the one or more configuration points specify collection of the sample of the source data from the one or more data sources.

18. The fault detection system of claim 16, wherein the test result status indicator is based, at least in part, on the result of executing the one or more instructions including determining:
(a) whether the sample of the source data contains a correct number of columns according to a schema for the source data,
(b) whether data in each column of the sample of the source data adheres to a data type of the column as specified in a schema for the source data,
(c) whether data in each column of the sample of the source data improperly contains NULL values according to a schema for the source data, or
any combination of (a), (b), or (c).

* * * * *

UNITED STATES PATENT AND TRADEMARK OFFICE
CERTIFICATE OF CORRECTION

PATENT NO. : 10,936,479 B2
APPLICATION NO. : 16/572404
DATED : March 2, 2021
INVENTOR(S) : Peter Maag et al.

It is certified that error appears in the above-identified patent and that said Letters Patent is hereby corrected as shown below:

On the Title Page

Page 4 item [56]:
After "Official Communication for European Patent Application No. 14159629.6 dated Jul. 31, 2014" and before "Official Communication for European Patent Application No. 14159629.6 dated Sep. 22, 2014"
Insert --Official Communication for New Zealand Patent Application No. 627962 dated Aug. 5, 2014--.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*